United States Patent
Craelius et al.

(10) Patent No.: US 9,746,350 B2
(45) Date of Patent: Aug. 29, 2017

(54) MANUAL MANIPULATION APPARATUS

(71) Applicants: William Craelius, Piscataway, NJ (US);
Nicki Ann Newby, Somerset, NJ (US)

(72) Inventors: William Craelius, Piscataway, NJ (US);
Nicki Ann Newby, Somerset, NJ (US)

( * ) Notice: Subject to any disclaimer, the term of this patent is extended or adjusted under 35 U.S.C. 154(b) by 0 days.

(21) Appl. No.: 14/212,618

(22) Filed: Mar. 14, 2014

(65) Prior Publication Data
US 2014/0260681 A1 Sep. 18, 2014

Related U.S. Application Data

(63) Continuation-in-part of application No. PCT/US2012/055290, filed on Sep. 14, 2012.

(60) Provisional application No. 61/535,761, filed on Sep. 16, 2011.

(51) Int. Cl.
| | | |
|---|---|---|
| G01L 1/00 | (2006.01) |
| G01D 7/00 | (2006.01) |
| G06F 1/16 | (2006.01) |
| F16M 13/00 | (2006.01) |
| F16M 13/04 | (2006.01) |
| G01L 1/12 | (2006.01) |

(52) U.S. Cl.
CPC ............... *G01D 7/00* (2013.01); *F16M 13/00* (2013.01); *F16M 13/04* (2013.01); *G01L 1/12* (2013.01); *G06F 1/1632* (2013.01)

(58) Field of Classification Search
CPC . G01D 7/00; G01L 1/12; F16M 13/00; F16M 13/04; G06F 1/1632

USPC .......... 73/855–860, 862.69, 862.86
See application file for complete search history.

(56) References Cited

U.S. PATENT DOCUMENTS

| | | | | |
|---|---|---|---|---|
| 4,567,656 | A * | 2/1986 | Wallace | B26B 13/16 |
| | | | | 30/262 |
| 4,654,027 | A * | 3/1987 | Dragan et al. | 604/99.03 |
| 5,058,888 | A * | 10/1991 | Walker et al. | 482/8 |
| 6,317,618 | B1* | 11/2001 | Livni et al. | 600/410 |
| 6,429,849 | B1* | 8/2002 | An | G05G 9/047 |
| | | | | 345/161 |
| 6,478,638 | B2* | 11/2002 | Matsuda | B63H 21/22 |
| | | | | 440/1 |
| 6,948,502 | B2* | 9/2005 | Berger | A61B 6/0421 |
| | | | | 128/845 |
| 7,276,824 | B2* | 10/2007 | Statnikov | B06B 3/00 |
| | | | | 310/26 |
| 7,492,581 | B2* | 2/2009 | Kuo | E05B 17/2038 |
| | | | | 16/334 |
| 2003/0230180 | A1* | 12/2003 | Hines | 83/162 |
| 2005/0233871 | A1* | 10/2005 | Anders et al. | 482/93 |
| 2008/0003860 | A1* | 1/2008 | Carnevali | 439/296 |
| 2009/0253093 | A1* | 10/2009 | Albaya | A61C 7/04 |
| | | | | 433/4 |
| 2010/0071450 | A1* | 3/2010 | Tanaka et al. | 73/114.36 |

(Continued)

*Primary Examiner* — Max Noori

(57) ABSTRACT

A manual manipulation apparatus including a frame assembly, at least one handle associated with frame assembly, a mounting structure configured for mounting of a computer device relative to the frame assembly and an optional glide base connected to the frame assembly, the glide base defining an area of reduced friction. The handle can be configured as a grip handle which allows a gripping force to be applied and indicated.

31 Claims, 34 Drawing Sheets

(56) References Cited

U.S. PATENT DOCUMENTS

| | | | |
|---|---|---|---|
| 2012/0172873 A1* | 7/2012 | Artale | A61B 18/1442 606/46 |
| 2012/0216399 A1* | 8/2012 | Kawell | H01R 43/0421 29/882 |
| 2012/0298720 A1* | 11/2012 | Marczyk | 227/176.1 |

* cited by examiner

MANUAL MANIPULATION APPARATUS

The present application is a continuation-in-part of International Application No. PCT/US2012/055290, filed Sep. 14, 2012, which claims the benefit of U.S. Application No. 61/535,761, filed Sep. 16, 2011, and each of these prior disclosures are hereby incorporated by reference in their entirety.

FIELD OF THE INVENTION

The present invention relates to an apparatus that which can be used for purposes of rehabilitation, exercise, measurement, or entertainment, providing a frame assembly adapted such that it can glide, tilt, and be guided along a surface. A computer device can be attached to the apparatus.

BACKGROUND OF THE INVENTION

Prior art game accessories, sometimes called game wheels, steering wheels, game grips, or stands are known to those skilled in the art. For example, a game wheel can be used to hold a cell phone while the user plays a game that demands movement of the phone.

Previous game accessories may not easily be extended to larger and heavier smart devices, such as tablets. Because of their size and weight, they are more prone to dropping and breakage. Another problem with this technology is that these devices do not easily lend themselves to use by injured or otherwise disabled persons, particularly when being used in rehabilitation applications; the control of movement may be less precise than is desired for such applications. Yet another problem with this technology is that it does not provide for the use of manual force, much less the ability to alter than manual force as the user progresses through their rehabilitation in a controlled clinical setting.

There remains a need for an improved apparatus that allows a user, optionally with the assistance of a therapist or technician, to exercise their arm and hand through task-specific motions, while providing immediate feedback of muscular effort.

SUMMARY OF THE INVENTION

In one embodiment, the manual manipulation apparatus includes a frame assembly, at least one handle associated with frame assembly, a mounting structure configured for mounting of a computer device relative to the frame assembly, and a glide base connected to the frame assembly wherein the glide base defines an area of reduced friction.

In at least one exemplary embodiment, the invention provides a manual manipulation assembly including a manual manipulation apparatus and a guide defining a desired path of movement of the manual manipulation apparatus. The manual manipulation apparatus includes a frame assembly, at least one handle associated with frame assembly, a mounting structure configured for mounting of a computer device relative to the frame assembly, and a base. Optionally, a glide base is provided, and is connected to the frame assembly wherein the glide base defines an area of reduced friction. The guide can be implemented with one or a combination of graphics, rails, or applications within an associated computer device.

In at least one exemplary embodiment, the invention provides a manual manipulation apparatus including a frame assembly and at least one handle associated with frame assembly. The at least one handle can include a handle assembly that includes a fixed handle member and a second handle member moveable relative to the fixed handle member, a biasing member positioned between the fixed handle member and the second handle member which biases the second handle member to an initial position, and a force indicator configured to indicate a force applied to the handle members as the second handle member moves from the initial position toward the fixed handle member. A glide base is optionally connected to the frame assembly and defines an area of reduced friction. Alternatively, a fixed base may be connected to the frame assembly, or a glide base can be converted to a fixed base according to mechanical alternation known to own of ordinary skill in the art.

Sensed force can be registered visually or electronically, with or without assistance of the computer device, by any method known to those of ordinary skill in the art. Once registered, the sensed force can be, in certain embodiments, be displayed on the computer device, and used as additional input to a programmed application.

One aspect of the present invention provides a means by which an apparatus, comprising a frame assembly and attachments, can be directed to tilt, to glide along a surface, to be lifted, pulled, or pushed, and to be guided along prescribed pathways, an optional means for attaching a computer device to the frame assembly, and an optional means to enable the application and measurement of force.

The present invention also provides a method of providing rehabilitation or training to a user that includes providing one or more of any of the instantly disclosed manual manipulation devices, and instructing the user to apply a force to at least one handle or the movable platform of the manual manipulation device, as appropriate depending on the configuration of the manual manipulation apparatus. The force applied can be, for example, a linear force, a rotational force, or any other force required to manipulate the apparatus in the manner as made clear based on the description of the underlying apparatus and its intended use.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain features of the invention. In the drawings.

DETAILED DESCRIPTION OF THE INVENTION

Figure 1:
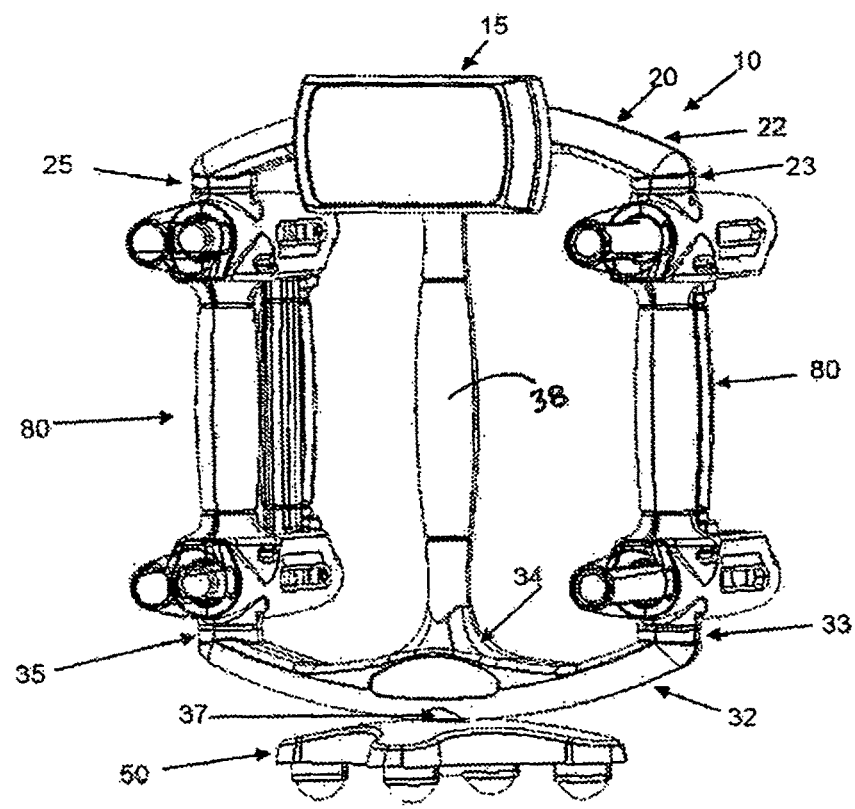
FIG. 1 is a perspective view of a manual manipulation apparatus according to an exemplary embodiment of the invention with an exemplary computer device attached thereto and supported on a non-tilting glide base.

The presently disclosed invention provides a method and an apparatus that can be used for purposes of measuring displacement, movement, and/or force, in 1, 2 or 3 dimensions. In certain embodiments, the presently disclosed manual manipulation device provides the ability to track performance data (e.g., game scores and other underlying movement data), display the data to the user, upload the performance data to a data server to allow third party analysis and input (e.g., a user's therapist or other medical professional). For example, the user's therapist can monitor a user's progress over time and make recommendations and/or changes to the recommended use of the presently disclosed device, and/or use this information to make other changes to the user's treatment regimen (e.g., changes in the pharmaceutical dosing regimen prescribed to the user).

In the drawings, like numerals indicate like elements throughout, unless the relevant disclosure dictates otherwise. Certain terminology is used herein for convenience only and is not to be taken as a limitation on the present invention. The following describes certain illustrative embodiments of the present invention. However, it should be understood, based on this disclosure that the invention is described by the claims, and is not limited by the embodiments described herein. It should also be understood that modifications described herein with respect to a particular embodiment(s) can be applied to other devices, even though not specifically mentioned therein, by those with ordinary skill in the art.

Figure 16:
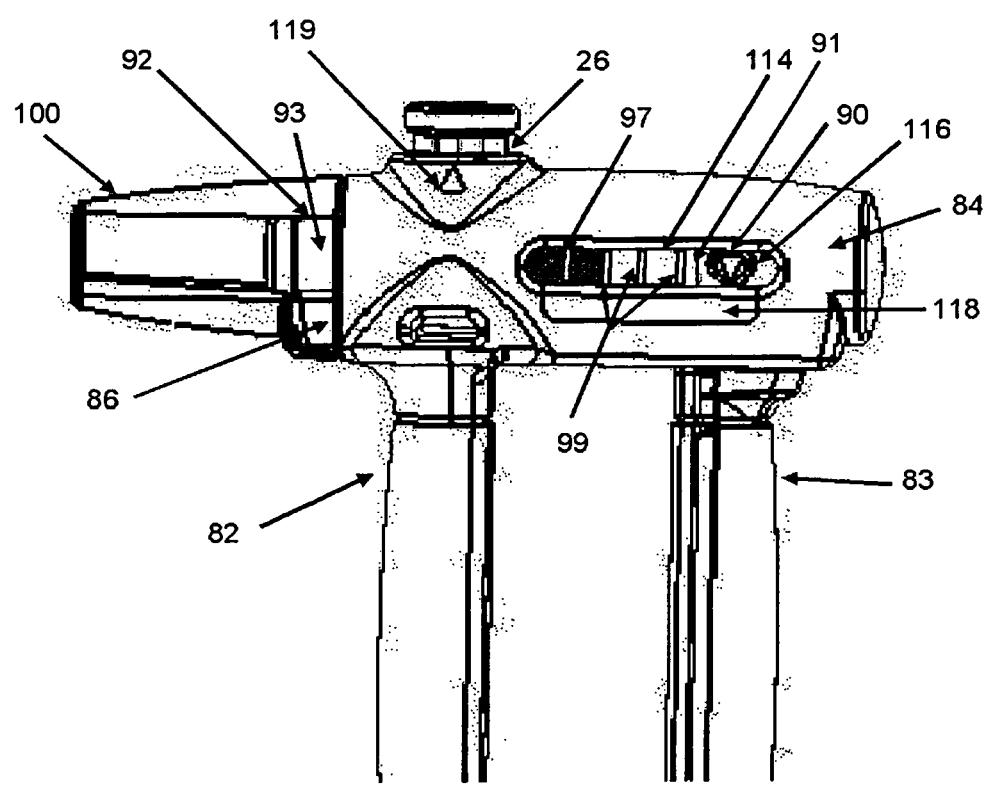
FIG. 16 is a side elevation of a portion of one of the grip handles of the manual manipulation apparatus of FIG. 1.

Referring to FIGS. 1-11 and 16-20, a manual manipulation apparatus 10 in accordance with a first exemplary embodiment of the invention will be described. The manual manipulation apparatus 10 of the present embodiment generally comprises a frame assembly 20, a glide base 50 and a pair of handles 80. The frame assembly 20 includes first and second outer frame members 22, 32 connected to one another by a central frame member 38. The outer frame member 22 has an arcuate body extending between opposed ends 23 and 25. The outer frame member 32 has an arcuate body extending between opposed ends 33 and 35. The central frame member 38 is a linear member which connects at a central region 24, 34 of each outer frame member 22, 32 with the inner arcuate surfaces facing one another and the ends 23, 33 aligned and the ends 25, 35 aligned. A handle 80 extends between ends 23 and 33 and a second handle 80 extends between the ends 25 and 35. In the present embodiment, each of the handles 80 is rotatably connected to the respective ends 23, 33 and 25, 35 such that the handles 80 can rotate relative to the frame assembly 20. The ends 23, 25, 33, 35 can be provided with a scale indicator 26, such as shown in FIG. 16, which aligns with a pointer 119 on the handle 80 to indicate the amount of relative rotation. As will be described in more detail below, the handles 80 are configured as gripping handles which allow application and measurement of force.

Figure 12:
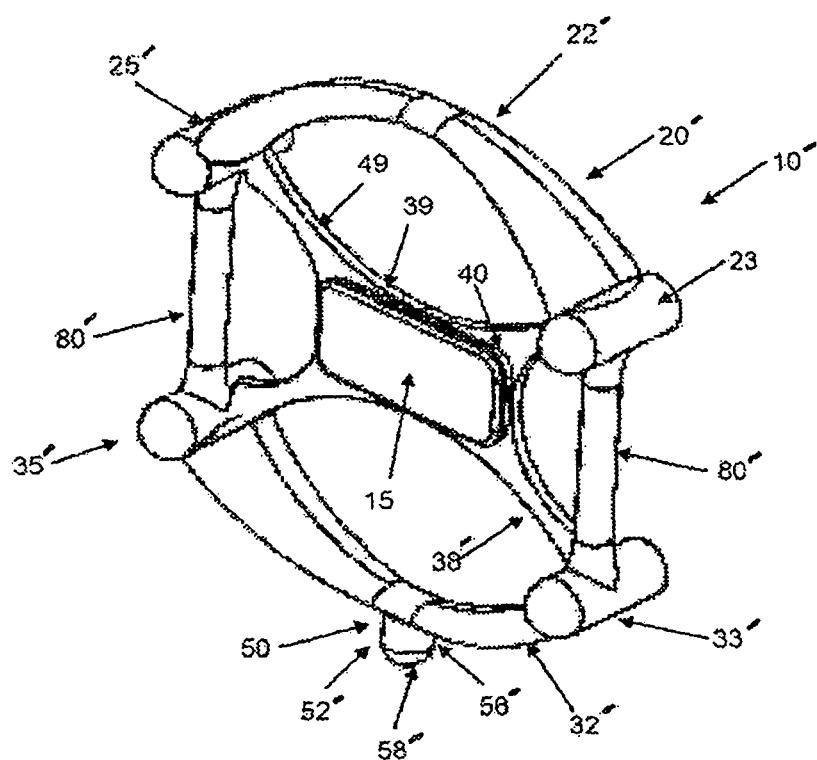
FIG. 12 is a perspective view of a manual manipulation apparatus in accordance with another exemplary embodiment of the invention.
Figure 13:
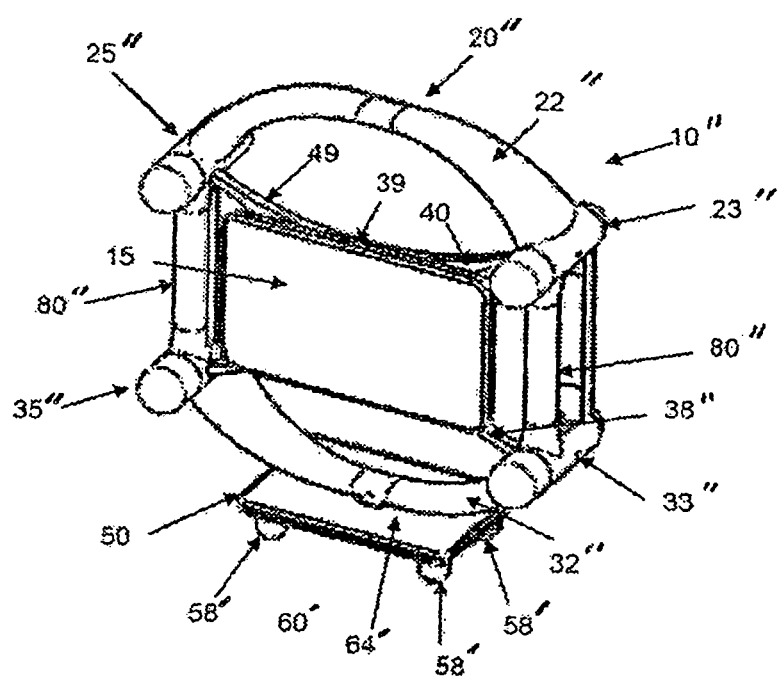
FIG. 13 is a perspective view of a manual manipulation apparatus in accordance with yet another exemplary embodiment of the invention with a non-tilting glide base attached thereto.

Referring to FIGS. 12 and 13, the frame assemblies 20', 20" of manual manipulation apparatuses 10' and 10" will be described. In each of these embodiments, the frame assembly 20', 20" includes outer frame members 22', 22" and 32', 32" connected by a central frame member 38', 38". In these embodiments, the central frame member 38', 38" includes a plate portion 39 with legs 49 extending therefrom. The legs 49 connect near the ends 23', 23", 25', 25", 33', 33", 35', 35" such that the plate portion 39 is supported between the outer members 22', 22" and 32', 32". The mounting structure 40 is provided on the plate portion 39 and can take any form of the mounting structure 40 described herein. In the manual manipulation apparatus 20', the handles 80' are linear members which extend between the ends 23', 33' and 25', 35', respectively. The handles 80' of FIG. 12 are not rotatable relative to the frame assembly 20'. In the manual manipulation apparatus 20", the handles 80" are gripping handles, similar to the handles 80, which extend between the ends 23", 33" and 25", 35", respectively, but are not rotatable relative to the frame assembly 20". Each of the manual manipulation apparatus 10', 10" are useable with a desired glide base 50 as will be described hereinafter. Alternatively, any of the instantly described manual manipulation apparatus can be used with a non-gliding base (e.g., a fixed base) or no base at all.

Figure 21:
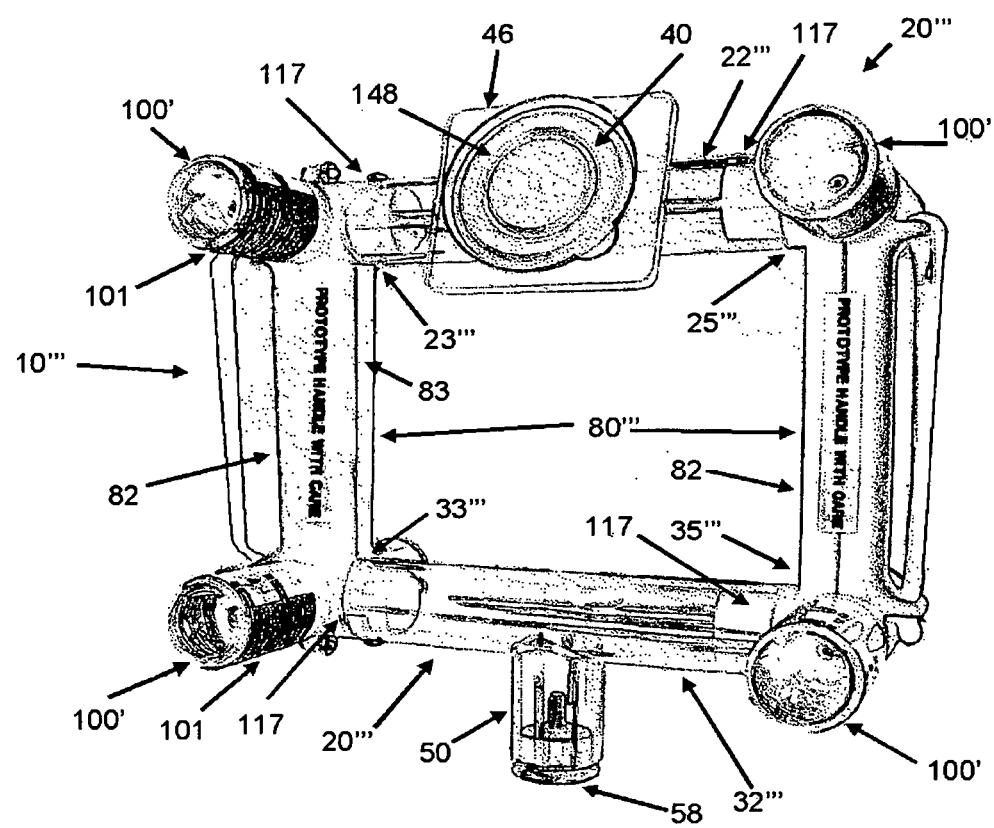
FIG. 21 is a perspective view of a manual manipulation apparatus in accordance with yet another exemplary embodiment of the invention.

Referring to FIG. 21, the frame assembly 20''' of manual manipulation apparatus 10''' will be described. The frame assembly 20''' includes outer frame members 22''' and 32''', however, the frame assembly 20''' does not include a central frame member. Each outer frame member 22''' and 32''' includes a hollow tube with open ends 23''', 25''' and 33''', 35''' which are configured to receive projections 117 extending from the handles 80'''. The mounting structure 40 is provided on the outer frame member 22''' and can take any form of the mounting structure 40 described herein. As illustrated, the mounting structure 40 includes a mounting plate 46 with an adhesive area 148 which can releasably secure the computer device 15. The outer frame member 22''' is preferably rotatably adjustable relative to the projections 117 such that the orientation of the mounting plate 46 can be adjusted. The handles 80''' are not rotatable about their own axis, but otherwise are gripping handles, similar to the handles 80. The handles 80''' include covers 100' which include force markings 101 on the surface of the cover, otherwise the handles 80''' are generally the same as the handles 80 described in detail below. The outer frame member 32''' includes a projection which is configured to connect with a desired glide base 50 as will be described hereinafter.

Referring again to FIGS. 1-3, and especially to FIG. 2, the frame assembly 20 includes a mounting structure 40 configured to support a computer device 15, for example but not limited to, a tablet computer (e.g., an iPad™, Samsung Galaxy™ tablets, or the like) or a smart phone (e.g., an iPhone™, Samsung Galaxy™ phones, or the like). In the embodiment illustrated in FIG. 2, the mounting structure 40 includes an area of hook and loop fastener 41 (e.g. Velcro™ or the like). The computer device 15 has a complementary area of hook and loop fastener material (not shown) secured directly to it or to a case or the like in which the computer device 15 is positioned.

Figure 2:
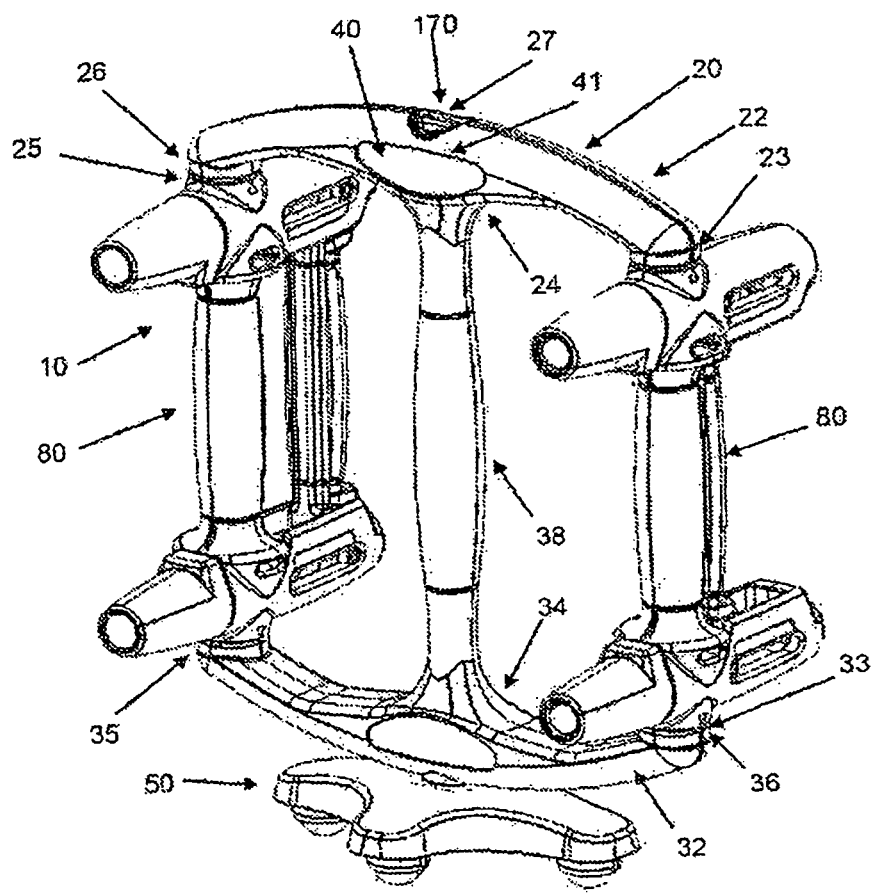
FIG. 2 is a perspective view of the manual manipulation apparatus of FIG. 1 with the computer device removed.
Figure 4:
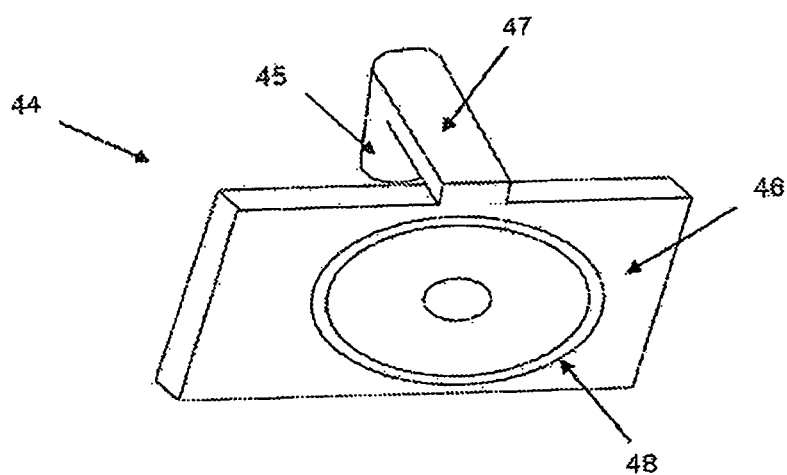
FIG. 4 is a perspective view of an exemplary computer device mounting member.
Figure 5:
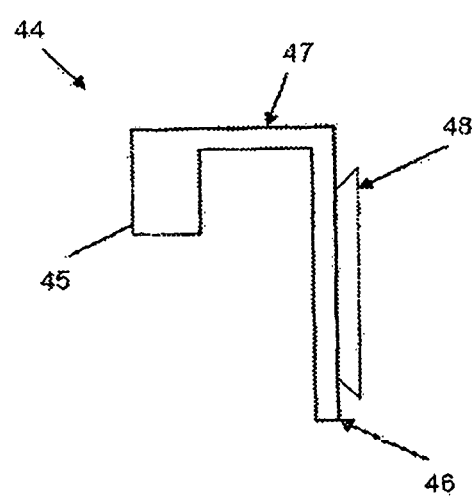
FIG. 5 is a side elevation view of the mounting member of FIG. 4.
Figure 6:
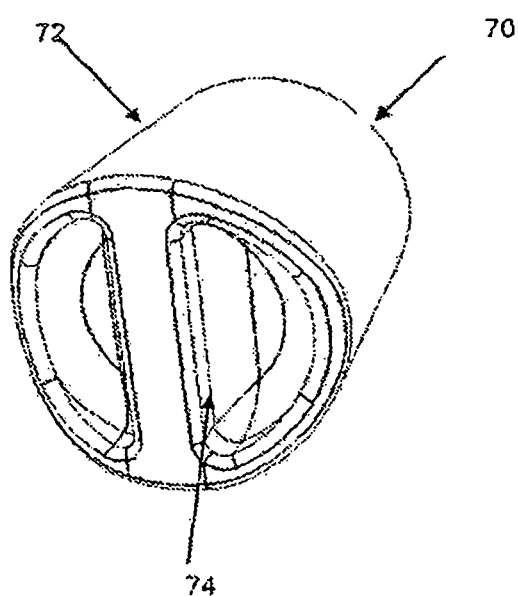
FIG. 6 is a perspective view of an exemplary plug.

Other mounting structures 40 can be utilized. For example, FIGS. 4 and 5 show an exemplary mounting member 44 which is connectable with the frame assembly 20. The mounting member 44 includes a connection portion 45 configured to be received in bore 27 along the outer surface of outer member 22 (e.g, of FIG. 2). In FIG. 2, the bore 27 is shown closed by a plug 70 similar to the one illustrated in FIG. 6. The plug 70 includes a cylindrical body 72 with a grip section 74 at one end thereof. The cylindrical body 72 of the plug 70 fits into the bore 27 to close such when not being utilized. The grip section 74 allows the plug 70 to be pulled from the bore 27 when it is desired to use the bore 27.

Referring again to FIGS. 4 and 5, a bridge portion 47 extends from the connection portion 45 to a mounting plate 46. When the connection portion 45 is positioned in the bore 27, the mounting plate 46 is maintained relative to the frame assembly 20. In the illustrated embodiment, the mounting plate 46 is parallel to the connection portion 45, however, the bridge portion 47 can be configured such that the mounting plate 46 is at a different orientation. Additionally, adjustment means can be included such that the orientation of the mounting plate 46 relative to connection portion, and thereby the frame assembly 20, can be adjusted. The mounting plate 46 includes a suction cup 48 which can releasably secure the computer device 15. The mounting plate 46 can include alternative means of securing the computer device 15, for example, straps, clips, walls, grooves or other desired structures.

Referring to FIG. 1, the outer frame member 32 includes a bore 37 in its outer surface configured to connect a desired glide base 50 to the frame assembly 20. As with the bore 27, a plug 70 can be positioned in the bore 37 when not in use. Alternatively, the frame assembly 20 can be provided without a bore if the manual manipulation device 10 is to be used without a glide base. The glide base 50 can take various configurations, exemplary configurations are described below, but in each case provides an area of reduced friction. The area reduced friction can be a function of the structure, e.g. ball bearing, the shape, e.g. semi-spherical, the material, e.g. non-friction, Teflon™ coated material, or a combination of these features or other features which facilitate such reduced friction.

Figure 3:
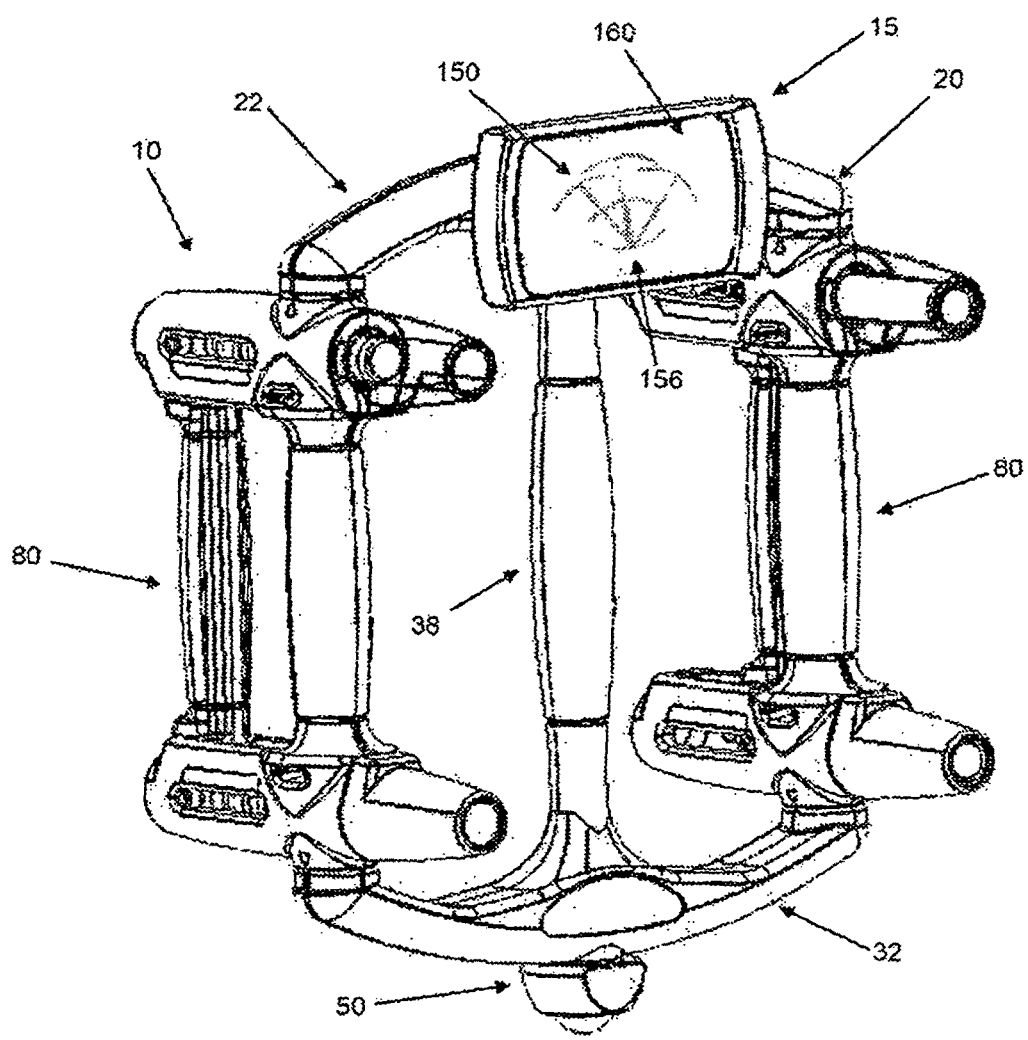
FIG. 3 is a perspective view illustrating the manual manipulation apparatus of FIG. 1 with a multi-directional tilting glide base.
Figure 7:
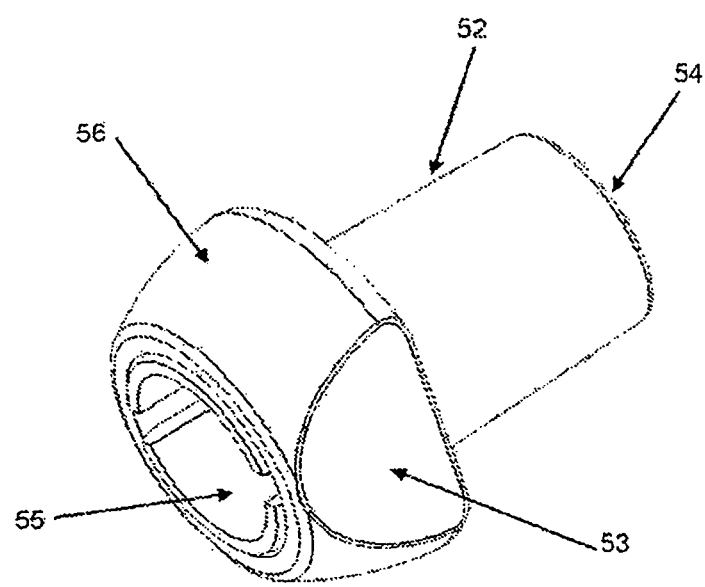
FIG. 7 is a perspective view of an exemplary multi-directional glide base with the bearing removed.
Figure 8:
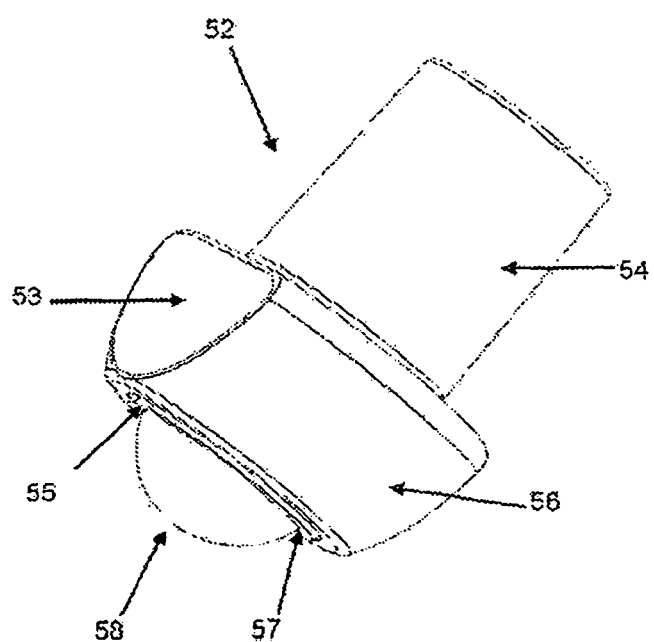
FIG. 8 is a perspective view of the multi-directional tilting glide base of FIG. 7 with a ball bearing positioned therein.

Referring to FIGS. 3, 7 and 8, an exemplary multi-direction glide base 52 will be described. The glide base 52 includes a connection portion 54 configured to be received in the bore 37, preferably with a friction fit, to secure the glide base 52 relative to the frame assembly 20 as shown, for example, in FIGS. 3 and 7. Referring to FIG. 7, a head portion 56 extends from the connection portion 54 and defines a bearing chamber 55 configured to receive ball bearing 58 (of FIG. 8) with a portion of the ball bearing 58 extending from the head portion 56. A bushing 57 or the like can be utilized to retain the ball bearing 58 in position. The ball bearing 58 allows the manual manipulation apparatus 10 to easily glide relative to a surface upon which it is placed. Additionally, since the ball bearing 58 has a spherical surface and extends from the head portion 56, the frame assembly 20 can be tilted in any direction over a given range until the head portion 56 contacts the surface. If desired, a cylindrical bearing could be used instead of a ball bearing, whereby the frame assembly would only be tiltable in a direction perpendicular to the axis of the cylindrical bearing.

FIG. 12 illustrates an alternative multi-direction glide base 52' which includes a head 56' formed integral with a semi-spherical bearing surface 58'. The bearing surface 58' is made from a material which will slide relative to a generally smooth surface, for example, a plastic or polymer alone or treated with Teflon™ or the like. In all other respects, the glide base 52' works the same as described above. While the bearing surface 58' is defined as semi-spherical, it can have other shapes or configurations, for example, a conical or truncated-conical shape, semi-elliptical, or any other desired configuration which provides a reduced friction surface.

Figure 9:
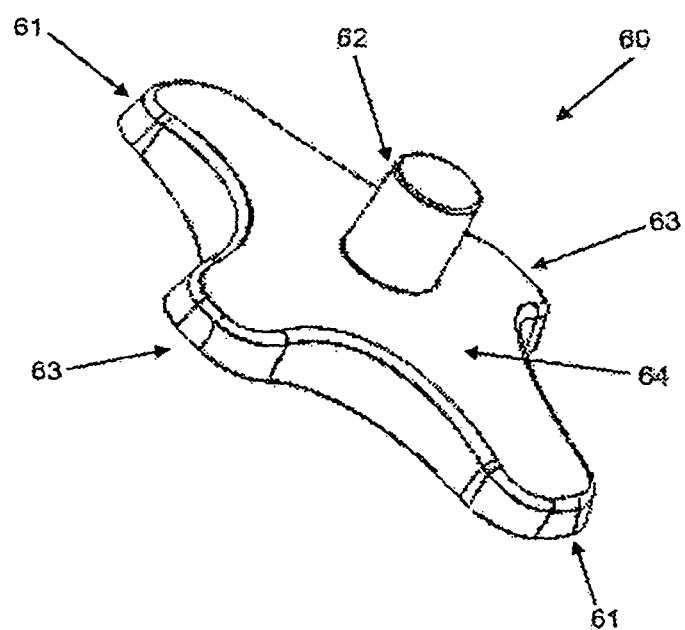
FIG. 9 is a top perspective view of an exemplary non-tilting glide base with the bearings removed.
Figure 10:
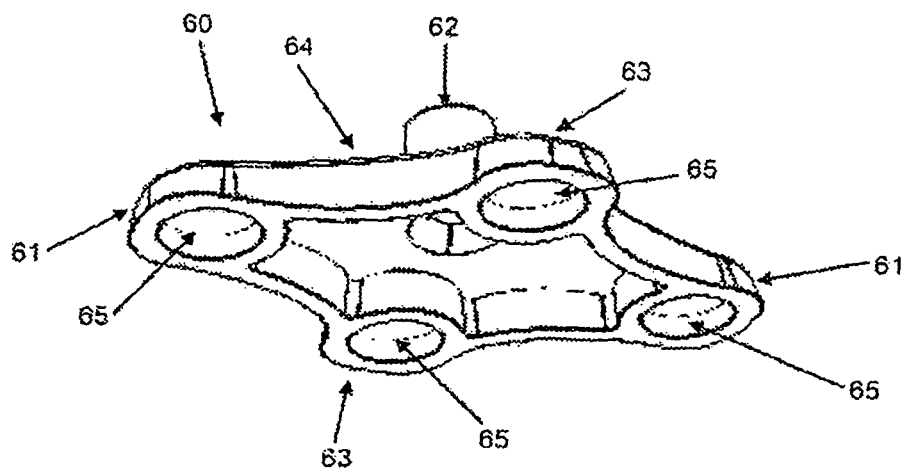
FIG. 10 is a bottom perspective view of the non-tilting glide base of FIG. 9 with the ball bearings removed. This type of base, or any other base described herein, could have a flat bottom and be provided with a substance on the exterior that adheres the base to the surface, thus allowing the entire apparatus to be fixed in place.
Figure 11:
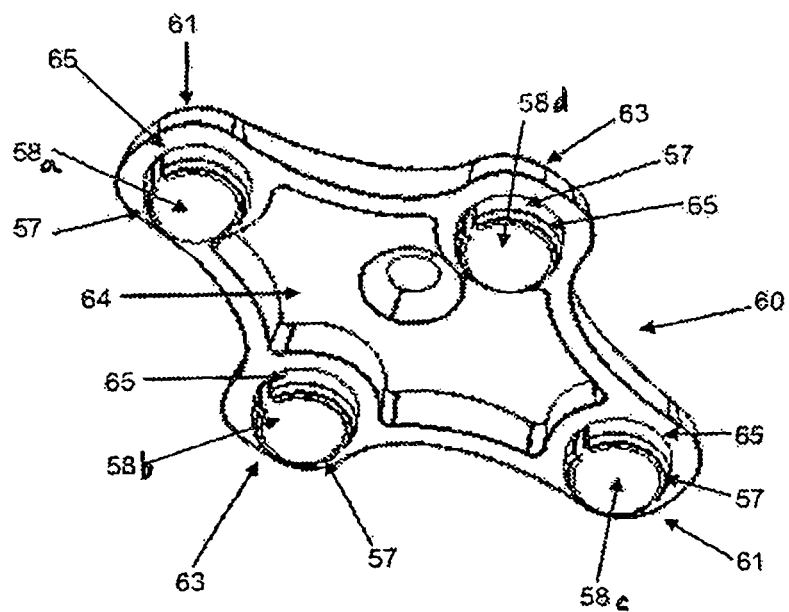
FIG. 11 is a bottom perspective view of the non-tilting glide base of FIG. 9 with ball bearings positioned therein.

Referring to FIGS. 1 and 9-11, another form of glide base 50, namely a non-tilting glide base 60, will be described. With reference to FIG. 9, the glide base 60 includes a connection portion 62 configured to be received in the bore 37, preferably with a friction fit, to secure the glide base 60 relative to the frame assembly 20 as shown in FIG. 1. A cross shaped body portion 64 extends from the connection portion 62 with opposed longitudinal portions 61 and opposed lateral portions 63. A bearing chamber 65 is defined in the lower surface of each of the longitudinal portions 61 and lateral portions 65. With reference to FIG. 11, each bearing chamber 65 is configured to receive a ball bearing 58*a*-58*d* with a portion of the respective ball bearing 58*a*-58*d* extending from the body portion 64. A bushing 57 or the like can be utilized to retain each ball bearing 58*a*-58*d* in position. The ball bearings 58*a*-58*d* allow the manual manipulation apparatus 10 to easily glide relative to a surface upon which it is placed, however, because ball bearings 58*a* and 58*c* oppose each other in the longitudinal direction and ball bearings 58*b* and 58*d* oppose each other in the lateral direction, the glide base 60 prevents tilting of the frame assembly 20.

Referring to FIG. 13, an alternative non-tilting glide base 60' is illustrated. In this embodiment, the body portion 64' has a rectangular configuration and a semi-spherical bearing surface 58' extends from each corner of the body portion 64'. Again, the bearing surface 58' is made from a material which will slide relative to a generally smooth surface, for example, a plastic or polymer alone or treated with Teflon™ or the like. In all other respects, the glide base 60' works the same as described above. It is noted that the body portion 64, 64" in these embodiments can have any desired configuration and the number of ball bearings 58 or bearing surfaces 58' can be other than four provided the glide base 60, 60' prevents tilting of the frame assembly 20. For example, the body portion 64, 64' can have a triangular configuration with three ball bearings 58 or bearing surfaces 58'.

Figure 14:
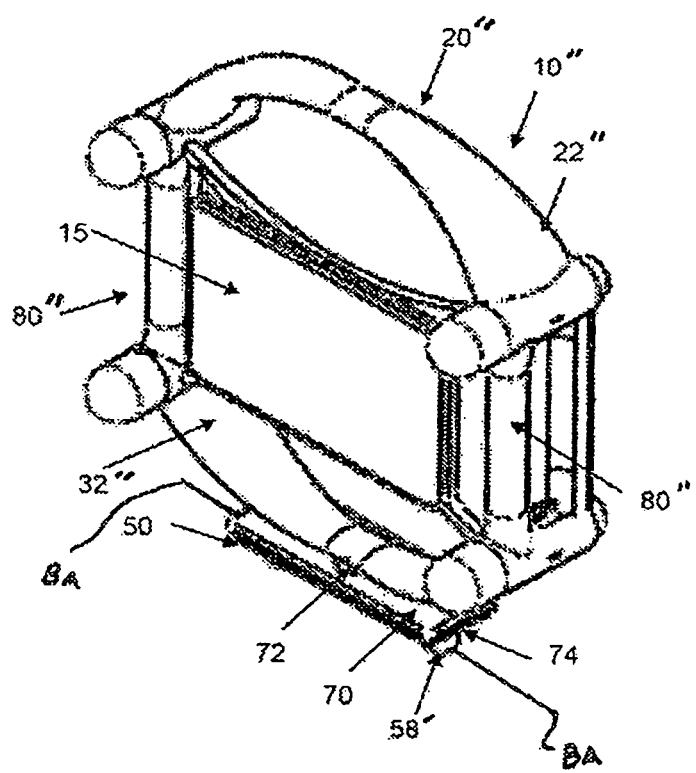
FIG. 14 is a perspective view of the manual manipulation apparatus of FIG. 13 with a single tilt axis glide base in a first orientation.
Figure 15:
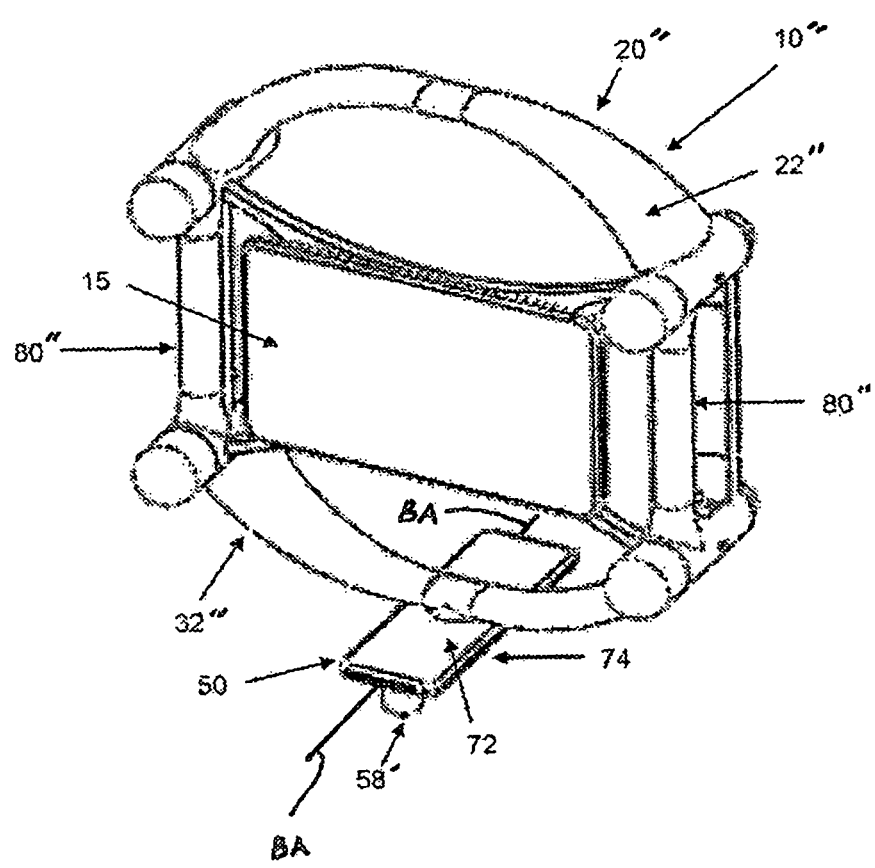
FIG. 15 is a perspective view similar to FIG. 14 with the single tilt axis glide base in a second orientation.

Referring to FIGS. 14 and 15, another form of glide base 50, namely a limited tilt glide base 70, will be described. The glide base 70 includes a connection portion 72 configured to be received in the bore 37, fit with friction or other means, to secure the glide base 70 relative to the frame assembly 20". A longitudinally extending body portion 74 extends from the connection portion 72. A pair of semi-spherical bearing surfaces 58' extends from opposed ends of the body portion 74 to define a linear bearing axis BA. With this configuration, the glide base 70 limits tilting in a direction perpendicular to the bearing axis BA. The glide base 70 can be connected to the frame assembly 20" in a desired orientation to achieve a desired tilting capability. For example, FIG. 14 illustrates the glide base 70 connected with the bearing axis BA parallel with the outer frame members 22", 32" such that the frame assembly 20" can be tilted forward and backward while FIG. 15 illustrates the glide base 70 connected with the bearing axis BA perpendicular to the outer frame members 22", 32" such that the frame assembly 20" can be tilted side to side.

Figure 19:
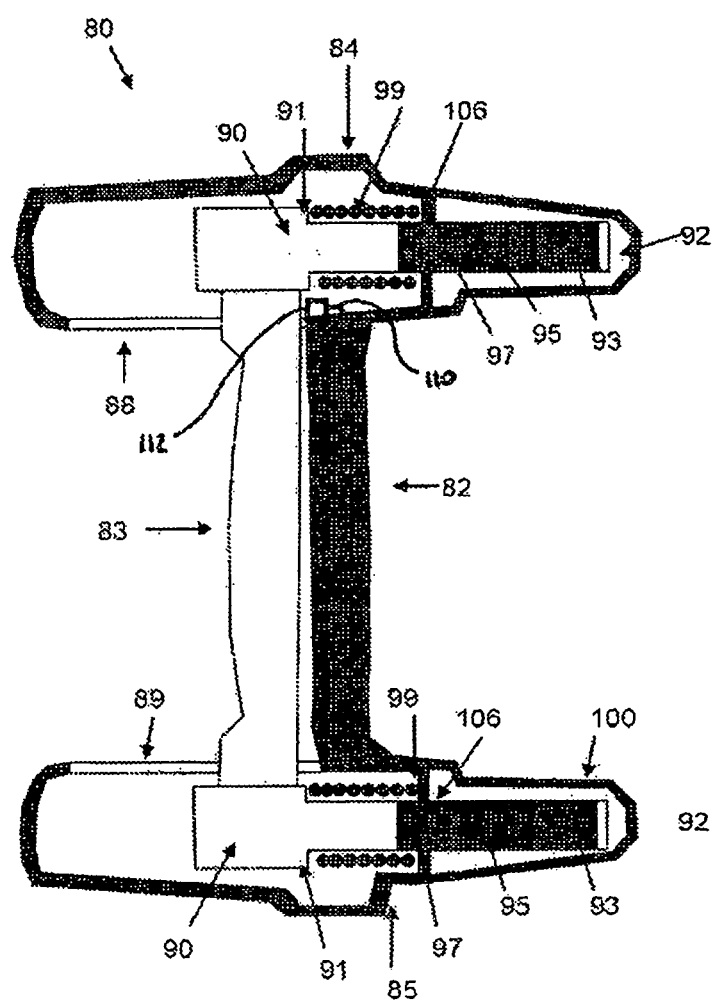
FIG. 19 is a cross-sectional view similar to FIG. 18 illustrating the grip handle in a compressed position.
Figure 20:
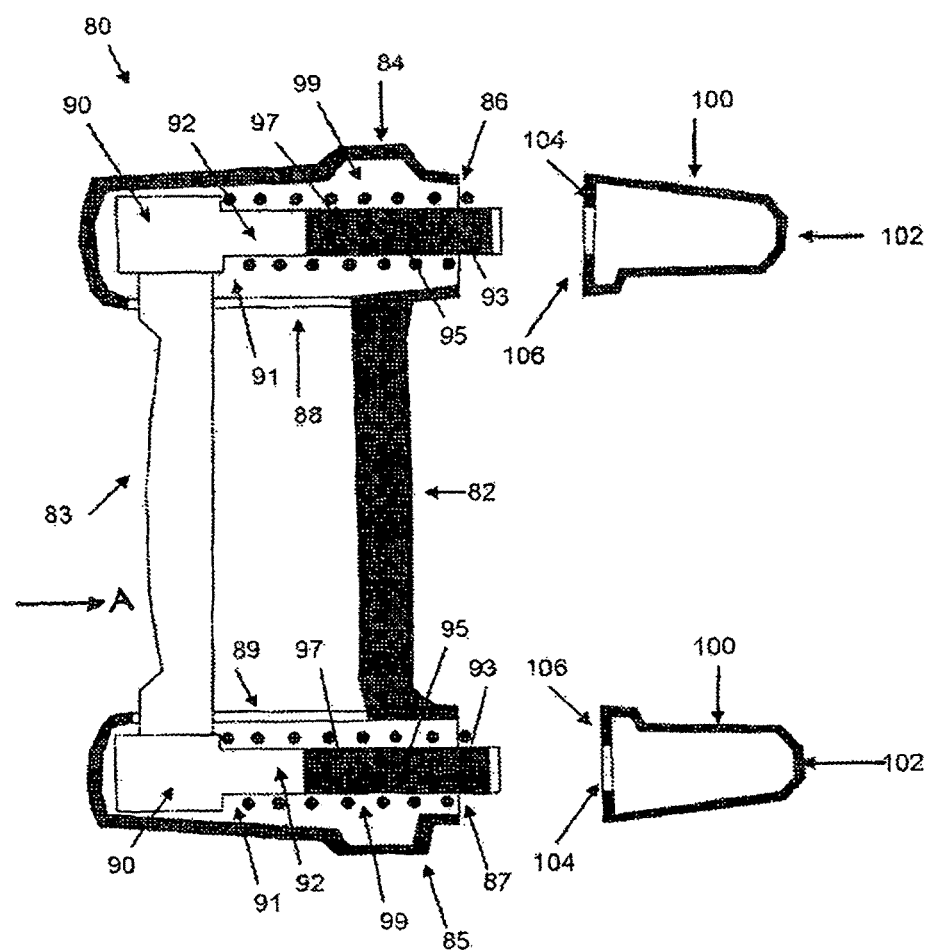
FIG. 20 is a cross-sectional view similar to FIG. 18 illustrating the grip handle viewing cover removed.

Referring to FIGS. 1-3 and 16-20, an exemplary handle 80, which can function as a grip handle, will be described. With reference to FIG. 20, each handle 80 includes a fixed handle portion 82 extending between a first housing 84 and a second housing 85. The first housing 84 is a generally hollow structure with an opening 86 at one end and an open slot 88 facing toward the opposite housing 85. Similarly, the second housing 85 is a generally hollow structure with an opening 87 at one end and an open slot 89 facing toward the opposite housing 84. Each housing 84, 85 houses a force indicator 90 with a rod portion 92 thereof extending out of the respective opening 86, 87. A moving handle portion 83 is connected between the force indicators 90 and is positioned to move in the two slots 88, 89. A spring 99 is positioned about each rod portion 92 and abuts against a shoulder 91 of the force indicator 90. The type of spring employed can be altered as strength improves (i.e. a stiffer spring can be inserted to increase the amount of force the user must apply to the gripping handle. Similarly, if another biasing member, besides a spring, is employed, one of ordinary skill can insert an alternative biasing member that requires the user to impart more force on the manual manipulation apparatus.

Figure 17:
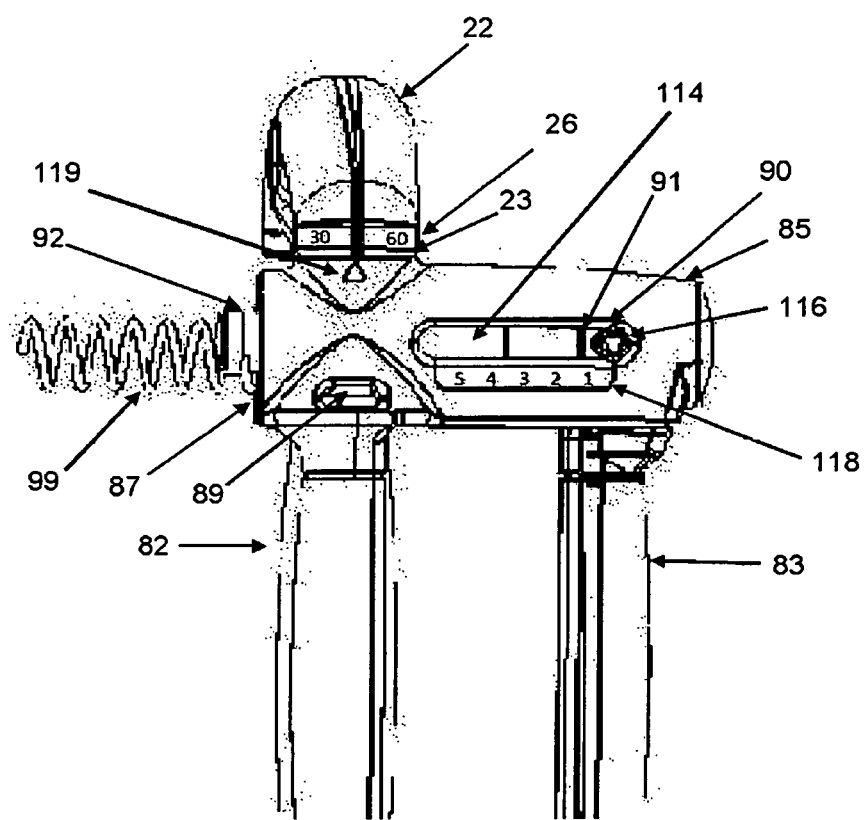
FIG. 17 is a side elevation similar to FIG. 16 with the grip handle viewing cover removed
Figure 18:
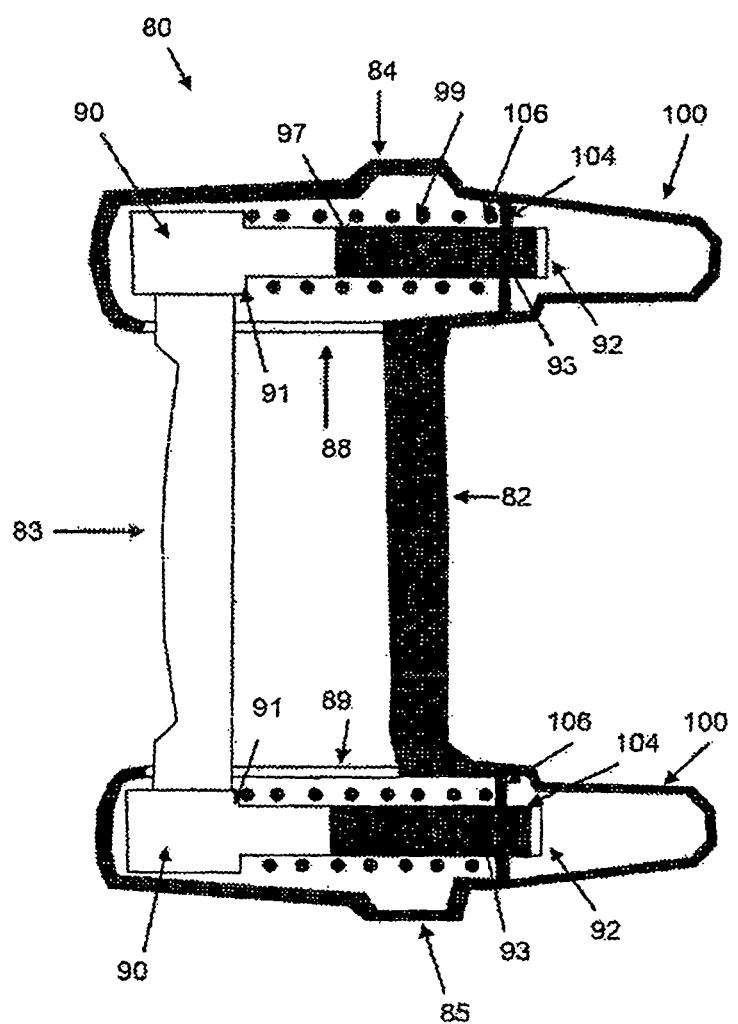
FIG. 18 is a cross-sectional view of an exemplary handle in an initial position.

A cover 100 is configured to be attached to each housing 84, 85 over the respective opening 86, 87. The cover 100 has body 102 defining a hollow chamber with an opening 104 at one end. The opening 104 is configured for passage of the rod portion 92 therethrough such that the rod portion 92 can be moved at least partially into the hollow chamber. A shoulder 106 is provided adjacent the opening 104 and is configured to engage and compress the respective spring 99 when the cover 100 is attached to one of the housings 84, 85. When the cover 100 is removed as indicated in FIG. 17, the spring 99 can be switched to change the biasing force to a desired level. Each force indicator 90 is biased away from the cover 100 and into its respective housing 84, 85 as indicated, for example, in FIG. 18. A user can grip the fixed handle 82 and the moving handle 83 and apply a force to move the moving handle 83 toward the fixed handle 82 as indicated by arrow A in FIG. 20.

With reference to FIG. 17, the force indicator 90 preferably provides a visible indication of the amount of force applied to the handle 80. In one aspect, with reference to FIG. 19, the rod portion 92 includes areas 93, 95, 97 of distinct indicators, for example, different color areas, and the cover 100 is transparent. As such, as force is applied to the handle 80, the rod portion 92 of the force indicator 90 moves into hollow chamber of cover 100 and the last indicator area 93, 95, 97 visible within the chamber indicates the applied force. Additionally, or alternatively, with reference to FIG. 16, a force indicating slot 114 can be provided through each housing 84, 85, with a force indication strip 118 applied to the external surface adjacent the slot 114. A projection 116 extends from the force indicator 90 into the slot 114. The position of the projection 116 relative to the force indication strip 118 indicates the applied force.

Additionally, or alternatively, with reference to FIG. 19, a force sensor 110, for example a piezoelectric strain gage, can be provided within one of the housings 84 and configured to sense a force upon movement of the moving handle 83 relative to the fixed handle 82. The force sensor 110 is connected to a transmitter 112 which is configured to transmit the sensed force to the computer device 15, for example, through a wireless or wired connection. Bluetooth or other wireless and wired communication means can also be utilized. The computer device 15 can be used to display, store or otherwise use the force data, for example, via an application stored on the computer device 15.

Figure 22:
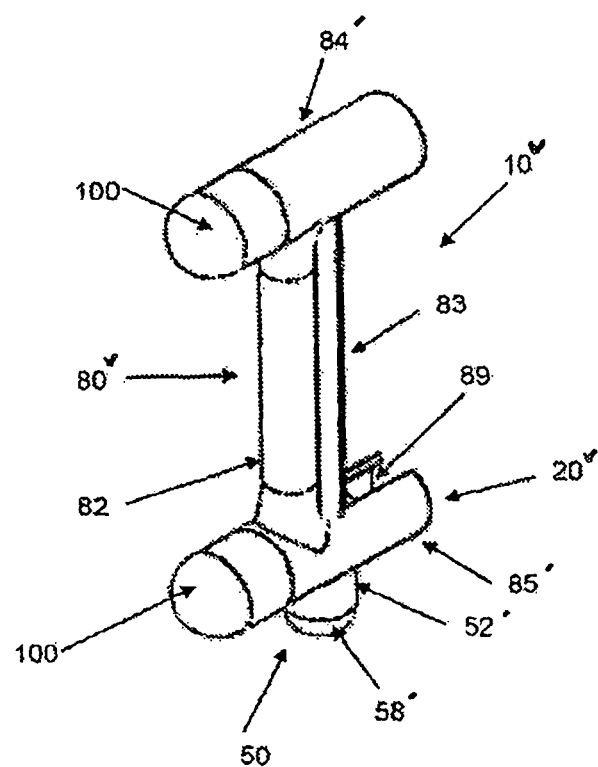
FIG. 22 is a perspective view of a manual manipulation apparatus in accordance with another exemplary embodiment of the invention.

Referring to FIG. 22, a manual manipulation apparatus 10$^V$ which is an embodiment of the invention will be described. The manual manipulation apparatus 10$^V$ generally comprises an independent handle 80$^V$ which is generally the same as the handle 80, but the housings 84' and 85' are not configured for attachment to a separate frame member. Instead, the housing 84' has a closed surface where the connection would have otherwise been and the housing 85' has on opening (not shown) configured for connection of a glide base 50. The housing 85' serves as the frame assembly 20$^V$ of the present embodiment. The glide base 50 can take the form of any of the glide bases described herein. The independent handle 80$^V$ allows a user to glidingly manipulate the handle 80$^V$, for example along one of the guides described herein, as well apply and observe a gripping force. A computer device is not utilized with the illustrated independent handle 80$^V$, however, a mounting structure could be provided. Similarly, each of the manual manipulation apparatuses described herein can be utilized without a computer device and may not include a mounting structure if not intended to be used with a computer device.

Figure 23:
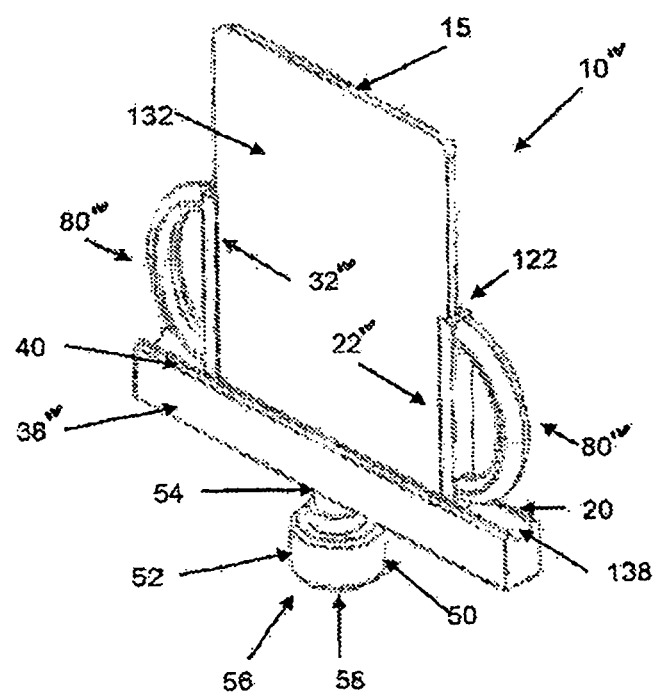
FIG. 23 is a perspective view of a manual manipulation apparatus in accordance with yet another exemplary embodiment of the invention with the computer device positioned in a first orientation.
Figure 24:
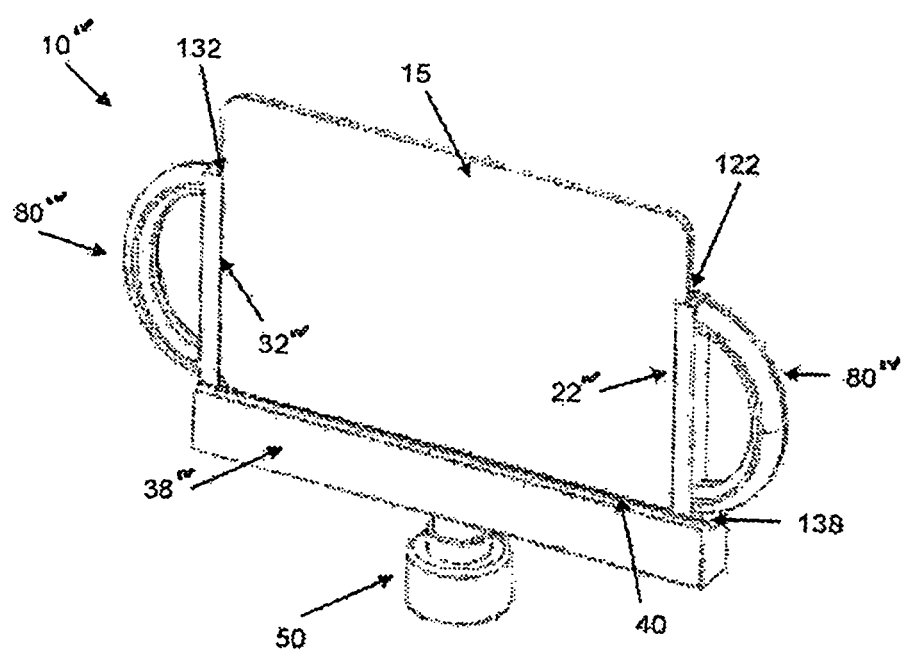
FIG. 24 is a perspective view similar to FIG. 23 with the computer device positioned in a second orientation.

Referring to FIGS. 23 and 24, a manual manipulation apparatus $10^{iv}$ embodiment in accordance with another embodiment of the invention will be described. The manual manipulation apparatus $10^{iv}$ includes a frame assembly $22^{iv}$ including a longitudinally extending frame member $38^{iv}$. A longitudinal groove 138 extends along a surface of the frame member $38^{iv}$. A pair of side frame members $22^{iv}$ and $32^{iv}$ are received in the groove 138 and extend perpendicularly to the frame member $38^{iv}$. Each of the frame members $22^{iv}$ and $32^{iv}$ is longitudinally adjustable along the groove 138 but is laterally locked into the groove 138. Each frame member $22^{iv}$ and $32^{iv}$ includes an inwardly facing groove 122, 132. The grooves 122, 132 and 138 are configured to receive and retain the computer device 15 and define the mounting structure 40 of the present embodiment. Each frame member $22^{iv}$ and $32^{iv}$ also includes an outwardly extending fixed handle $80^{iv}$ which facilitates manipulation of the frame assembly $20^{iv}$. The longitudinal extending frame member $38^{iv}$ includes a bore (not shown) or the like for connection of a glide base 50. The manual manipulation apparatus $10^{iv}$ is illustrated with a multi-directional glide base 52, however, it can be utilized with any of the glide bases 50 described herein.

Figure 25:
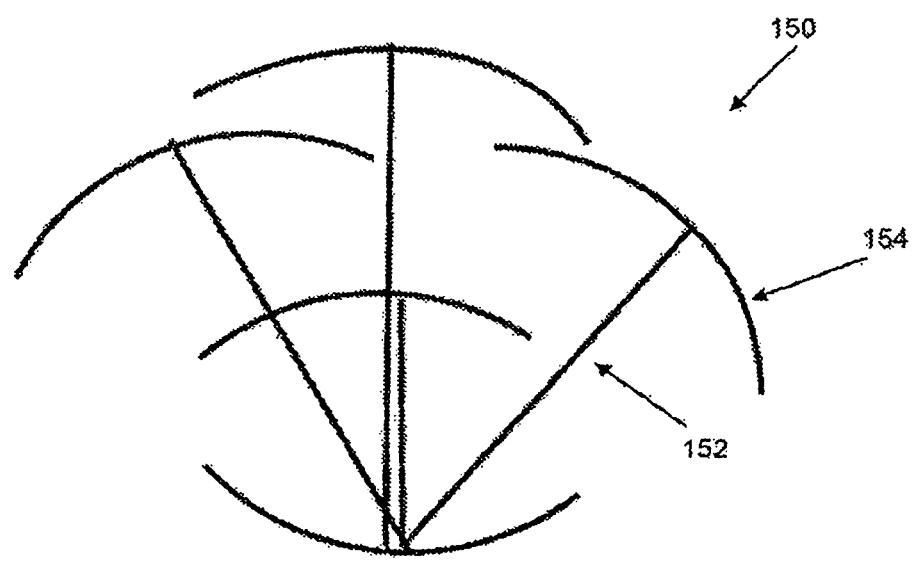
FIG. 25 is a plan view of an exemplary guide configuration.
Figure 27:
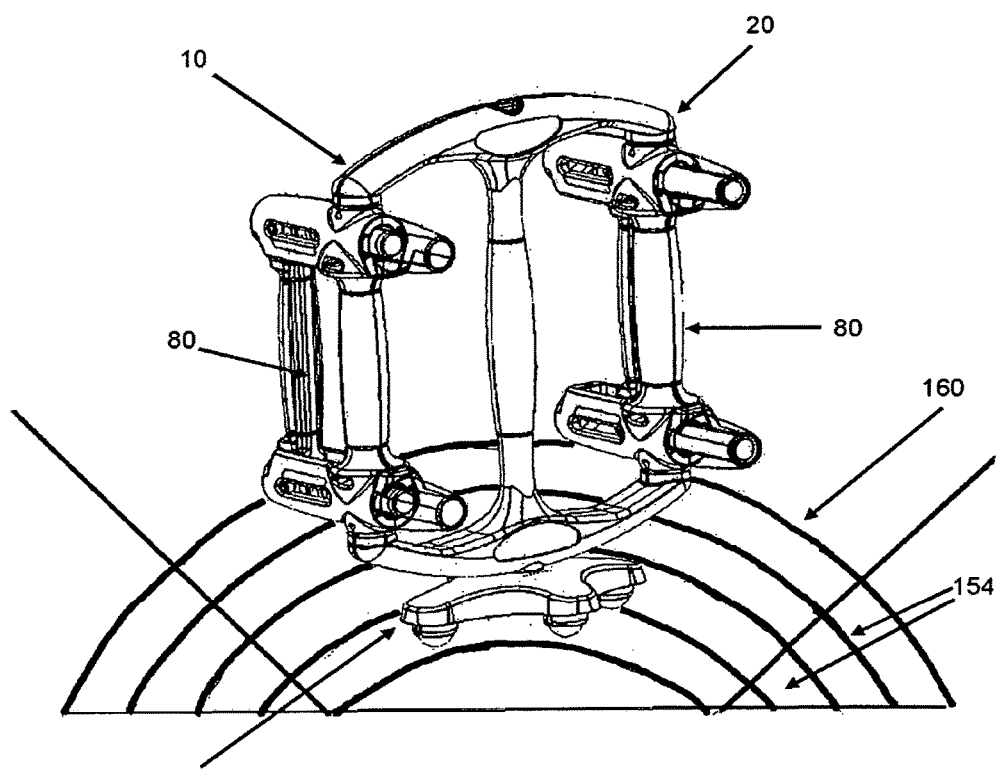
FIG. 27 is a perspective view illustrating the manual manipulation apparatus of FIG. 1 positioned on an exemplary guide mat.

With reference to, for example, FIG. 27, any of the disclosed manual manipulation apparatuses can be utilized with guides 150 which can take the form of a game, a map, a maze, a puzzle, a target or any other desired format. The guide 150 can be graphic or a three dimensional structure with rails, ramps, walls or the like. FIG. 25 illustrates a guide 150 which includes a plurality of linear 152 and arcuate 154 paths. Instead of providing paths, the arcuate 154 portions can represent instruction to tilt the manual manipulation apparatus $10$-$10^v$ as indicated. The guide can also be superimposed upon, or itself contain vertical and/or sloped surfaces to better indicate where it is desired to move the manual manipulation apparatus.

Figure 26:
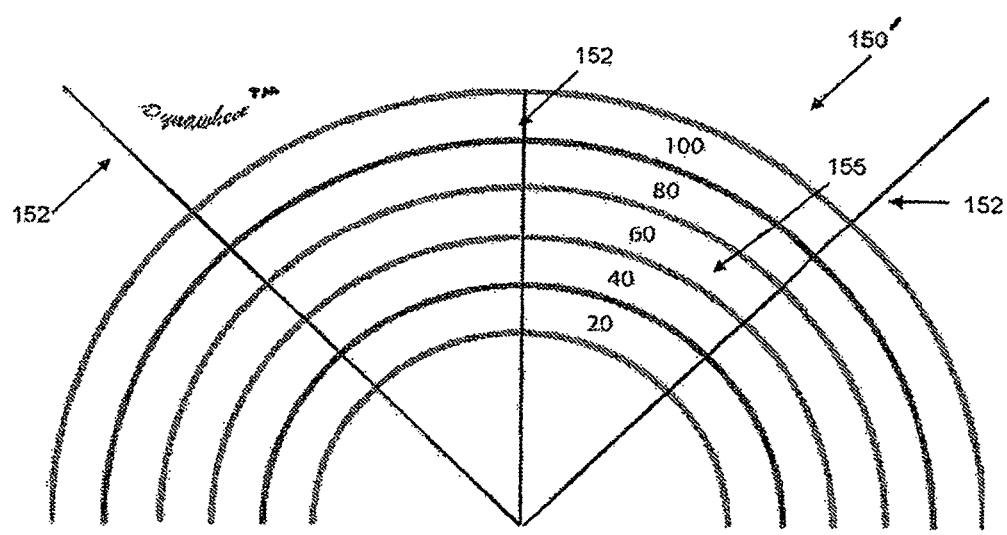
FIG. 26 is a plan view of another exemplary guide configuration.

The guide 150' of FIG. 26 includes a plurality of linear paths 152 and a plurality of target zones 155. While the paths 152, 154 are shown as linear and arcuate, they can take any desired form. FIG. 27 illustrates the guide 150 applied to a mat 160 which can be positioned on a table or other work surface. FIG. 3 illustrates a virtual form of the guide 150 which is displayed on the computer device 15. An indicator 156 on the screen represents the virtual position of the manual manipulation apparatus on the guide 150. As the manual manipulation apparatus is moved, the GPS, magnetometer, gyroscope, camera, and/or accelerometer or like sensor in the computer device recognizes the movement and moves the indicator 156 along the guide 150. In an exemplary game application, the guide 150 can take the form of a road and the indicator 156 can take the form of a vehicle. The guides can also be superimposed upon, or itself contain vertical and/or sloped surfaces to better indicate where it is desired to move the manual manipulation apparatus.

Figure 33:
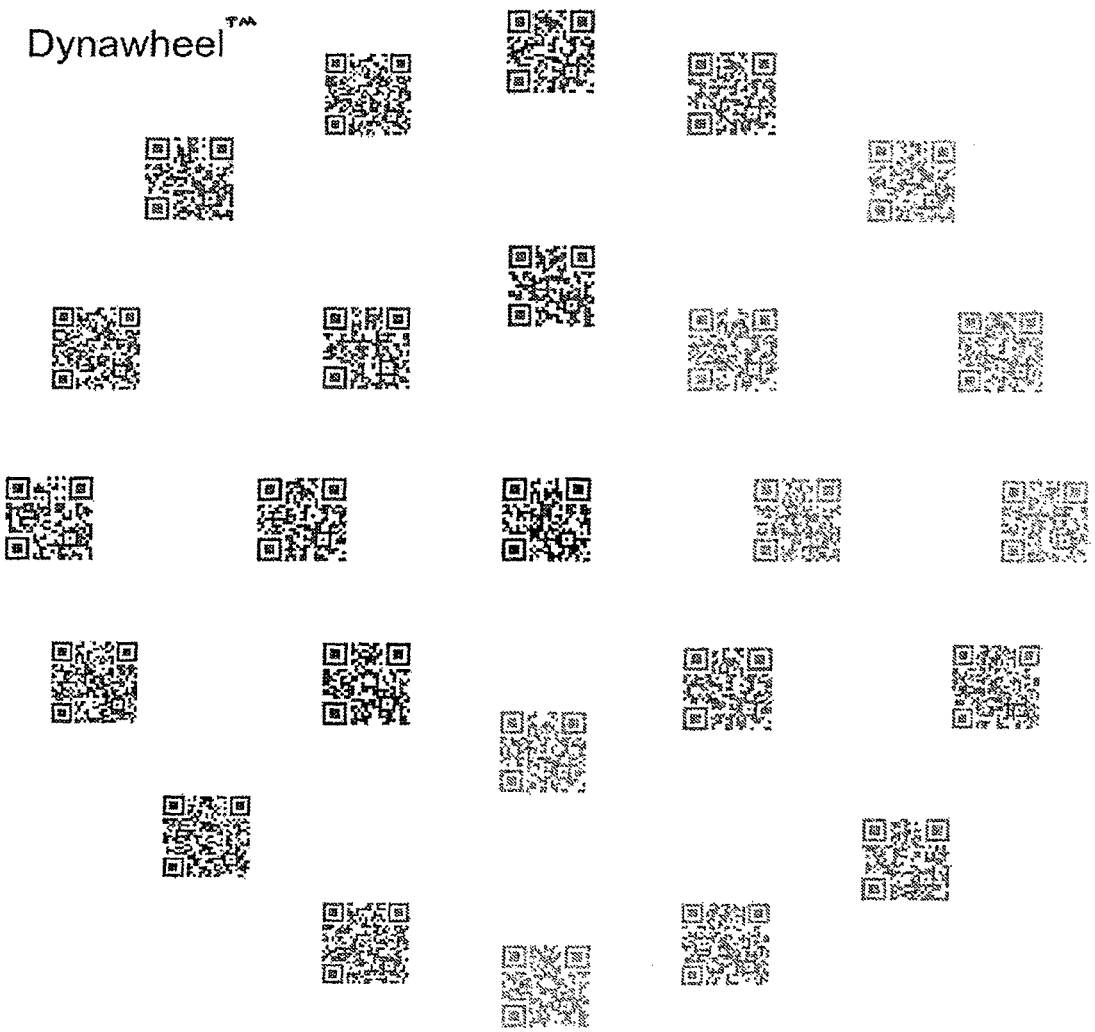
FIG. 33 is a depiction of a guide that employs pattern recognition technology.

As shown in FIG. 33, the guides that can be used in connection with the instantly disclosed manual manipulation apparatus can include pattern recognition technology, such as QR™ tags or other patterns. The manual manipulation apparatus, in such embodiments using QR tag guides, can include a QR™ reader or a similar pattern reader (provided, for example, via the computer device (e.g., smartphone or tablet) or separately provided) to obtain information from the patterns, which in turn can be transmitted to database and used to monitor a user's rehabilitation program using the instantly described manual manipulation devices. Other pattern recognition technology, besides QR™ tags, can be employed.

In certain embodiments of the presently disclosed invention, the manual manipulation apparatus includes a magnet, the computer device is provided with magnetometer, and the force placed upon the manipulation apparatus is determined via use of the magnetometer and the manipulation of the magnet. The magnet, in conjunction with a magnetometer, can also be used to measure angular rotation of the handle and can also be used to record linear motion. Given the amount of information that can be provided with a magnet and a magnetometer, any of the disclosed manual apparatus devices disclosed herein can be provided with a magnet and a magnetometer (e.g., a computer device that includes a magnetometer, such as a smartphone or tablet).

For example, in one exemplary embodiment, the apparatus can include a handle assembly to which a smartphone or tablet, can be attached. The force means can comprise a grip means, that can be compressed by squeezing with the hand, and that moves a linkage containing a permanent magnet that moves, for example, linearly with the spring as it is compressed. In another exemplary embodiment, the apparatus can provide a means to apply force to the spring from a moving or stationary object. The apparatus can provide the ability of measure linear or rotational motion.

Embodiments of the present invention provides a method whereby an object with a magnet attached or incorporated therein moving against a compressible element, can be tracked in time and space, so that the movement of the object, and the force imposed by the user upon it, can be registered. The physical effects of the force result in motions that can be registered via use of a magnetometer, which can be individually present or embodied in a multifunctional computer device (e.g. a smartphone), and analyzed to obtain measurements of force. The information can be displayed on an electronic screen and/or automatically transmitted to a data historian and maintained within a software application. This information can also be used to control a game on the computer device, as can data coming from any of the sensors (obtained by any means) that change as the user manipulates the device.

Use of a device containing magnets and a magnetometer will be further illustrated with reference to FIGS. 28-29. A magnet 1 is incorporated into a housing of the manual manipulation device disclosed therein. Though not limited thereto, the manual manipulation device disclosed in FIGS. 28-29 contains a frame assembly 3, and a spring chamber 4 containing a spring 7 (see FIG. 29). A computer device containing a magnetometer 2 is affixed to the manual manipulation device. When a user compresses the handle 5 to compress the spring, and move the magnet 1, a signal 6 representing the applied force is displayed on the computer device 2.

Figure 28:
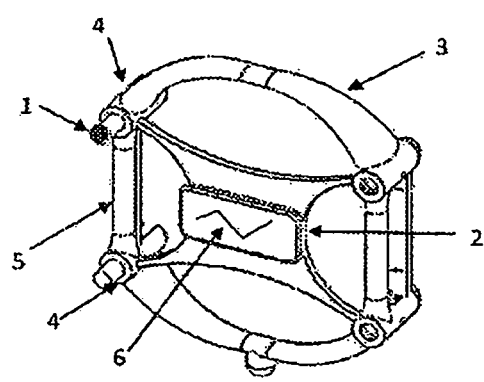
FIG. 28 is a perspective view of a manual manipulation apparatus in accordance with another exemplary embodiment of the invention.
Figure 29:
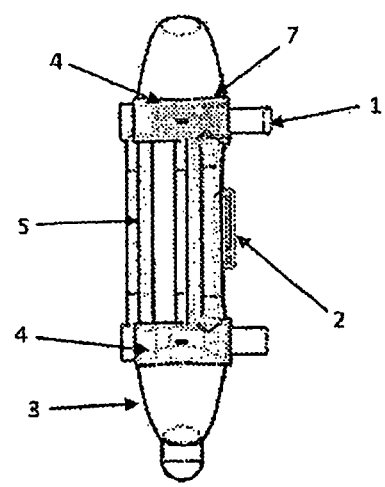
FIG. 29 is a side view of the manual manipulation apparatus of FIG. 28.
Figure 31:
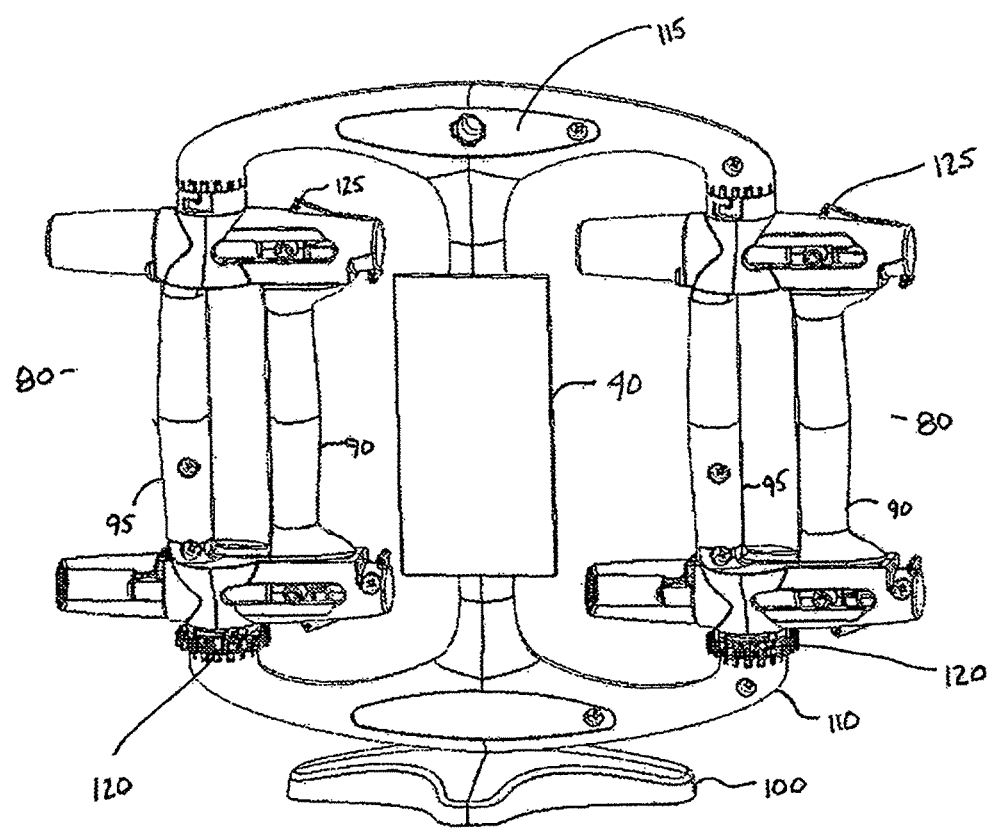
FIG. 31 is a perspective view of a manual manipulation apparatus according to an exemplary embodiment of the invention with a fixed base.
Figure 32:
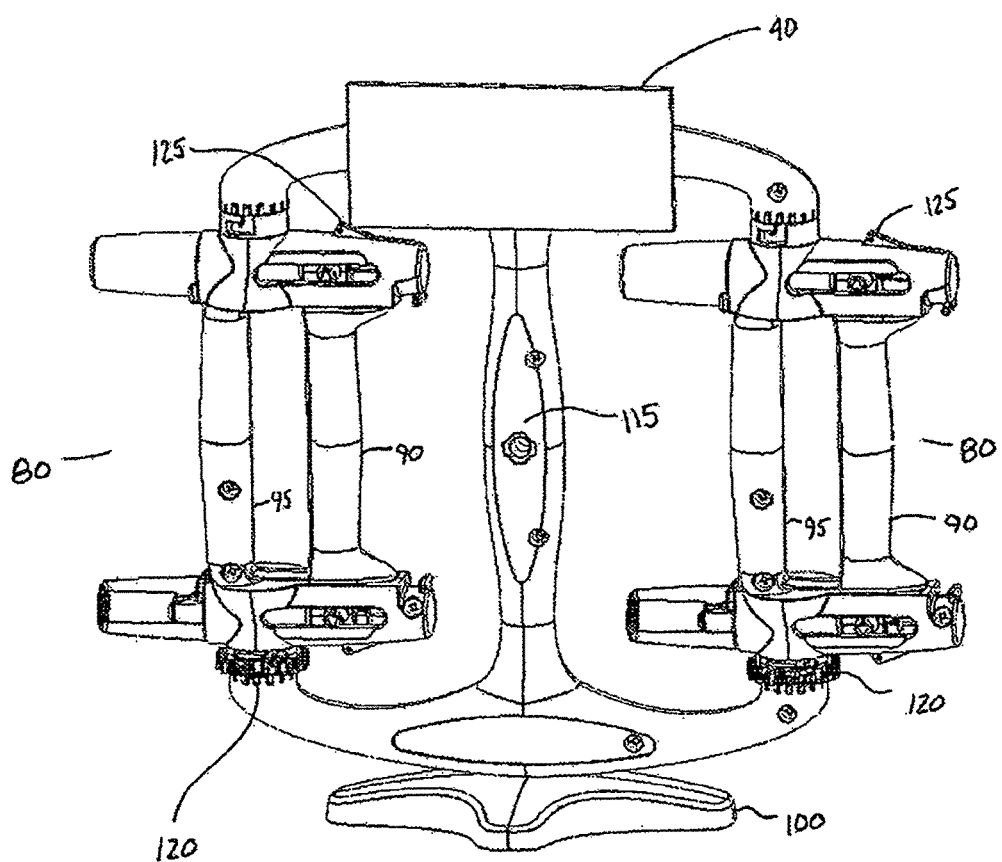
FIG. 32 is a perspective view of a manual manipulation apparatus according to another exemplary embodiment of the invention with a fixed base.

Alternatively, the manual manipulation device of, for example, FIG. 28, 31 or 32 can be modified such that it is intended for the user to apply a rotational force to the apparatus via the handle(s). This can be achieved via modification of, for example, the connection of the frame assembly to the base such that the frame assembly and handle(s) can be manipulated like a steering wheel. Alternatively, the apparatus can be modified such that the frame assembly and handles are pivotable in a manner analogous to a coin spinning on a table.

Similar to the above-described placement of the magnet and magnetometer in FIG. 28, angular rotation or any other indicia of displacement applied by the user can be obtained via the magnetometer based on the position of the magnet. Alternatively, angular rotation, for example, can be indicated by markings on the frame assembly and/or handle.

Figure 30:
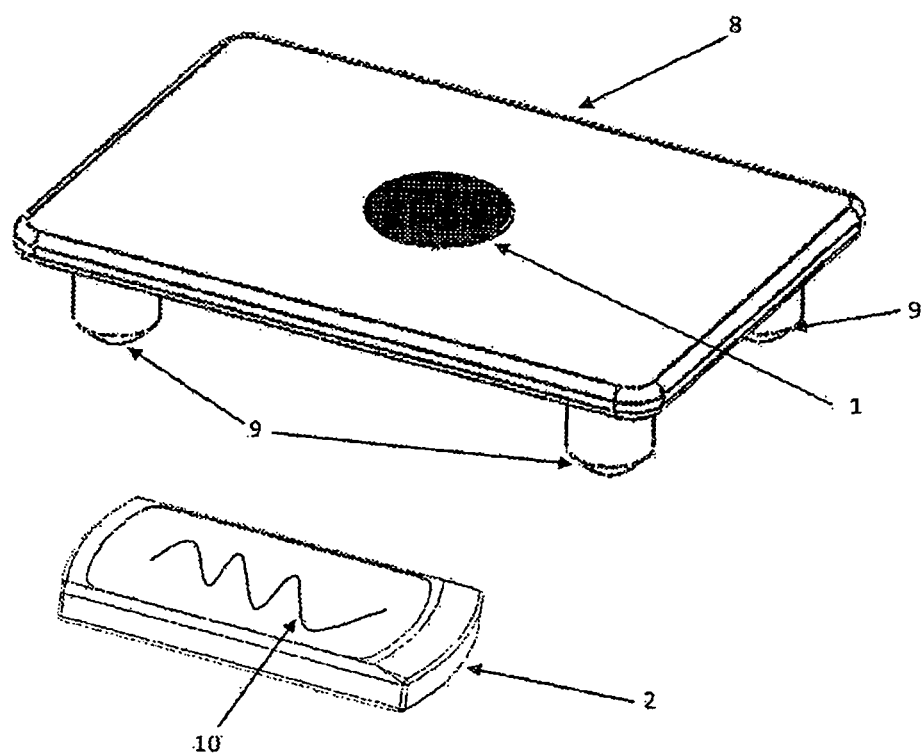
FIG. 30 is a perspective view of a manual manipulation assembly in accordance with another exemplary embodiment of the invention.

FIG. 30 discloses an alternative embodiment which employs magnets and a magnetometer. A movable platform 8, provided with a magnet 1 is provided. The movable platform is supported on roller balls 9 to provide a glide base which defines an area of reduced friction, thereby allowing platform movement by the user. A computer device 2, which in this embodiment is not integrally attached the manual manipulation device, but located in close proximity thereto, is provided and receives a signal 10 that represents movement of the manual manipulation apparatus in relation to the magnetometer, and, as described below, the amount of force applied to the device by the user. In an alternative embodiment, one or more of the movable platform and the glide base can be omitted. For testing purposes, for example, a handheld magnet in close proximity to a magnet can be employed.

Although not shown here, multiple magnets can be employed. For example, a magnet can be employed in connection with the each handle of the device such that input can be obtained from each of the handles, as desired.

As will be understood by those of ordinary skill in the art, the magnetometer registers the change in magnetic field as the magnet is displaced by the manual manipulation device. The computer device can then apply an algorithm to yield one or more of a measure of applied force, a measure of angular rotation with respect to the frame assembly, or a measure of linear motion, depending on the configuration of the manual manipulation device. Other methods of determining applied force via use of a magnet and magnetometer will present themselves to one of ordinary skill in the art. The signal 10 obtained thereby can be stored by the computer device, and/or automatically transmitted to a software application to manage the user's therapy. Thus, the measurement can be visible on the computer device, and/or communicated to a remote computer device, i.e. a separate computer device that need not necessarily contain a magnetometer. The usable range of the transducer can be made adjustable via, for example, alternations to one or more of the spring, the magnet and the magnetometer.

In an alternative embodiment, the magnetic and magnetometer assembly can control the operation of the computer device, whether the computer device be located in close proximity to the apparatus or remotely. Computer programmers of ordinary skill can incorporate programs and applications to work in accordance with the manual manipulation apparatuses disclosed herein, to manage exercise protocols or therapy in general, and, for example, the input of readings obtained from the device in particular.

With reference to FIGS. 31 and 32, a manual manipulation apparatus according to an alternative embodiment is disclosed. The manual manipulation apparatus disclosed therein similar to that described in FIG. 1, except that a base 100, is provided that, in this embodiment, remains fixed to surface and also fixed with respect to its orientation with the frame assembly 110. It is noted however, that this embodiment can be altered such that it is pivotable at the intersection of the base 100 and the frame assembly 110, via, for example, a ball swivel connection or the like, in which case the base 100 would serve as a glide base defining an area of reduced friction. The base and frame assembly could also be modified by one of ordinary skill to tilt in various directions.

In FIGS. 31 and 32, a mounting plate 40 is provided to house a computer device (not shown) in one of two locations, as shown in the figures, or the alternate location 115. The computer device can be affixed to the mounting plate via, for example, a hook and loop faster connection, or the mounting plate itself can take the form of a housing to hold the computer device. For example, the mounting plate can incorporate a soft case to completely encase the computer device when applied to the manual manipulation device. Due to the orientation of the mounting plates, the computer device can be displayed with portrait (FIG. 31) or landscape orientation (FIG. 32), as desired.

In this embodiment, a lock mechanism 120 is provided to allow the handles 80 to be locked into a desired angle of the handles with respect to the frame assembly. A second lock mechanism 125 is provided to allow the distance between the handle intended to be gripped 90 and the stationary handle 95 if be adjusted and locked as desired.

Figure 34:
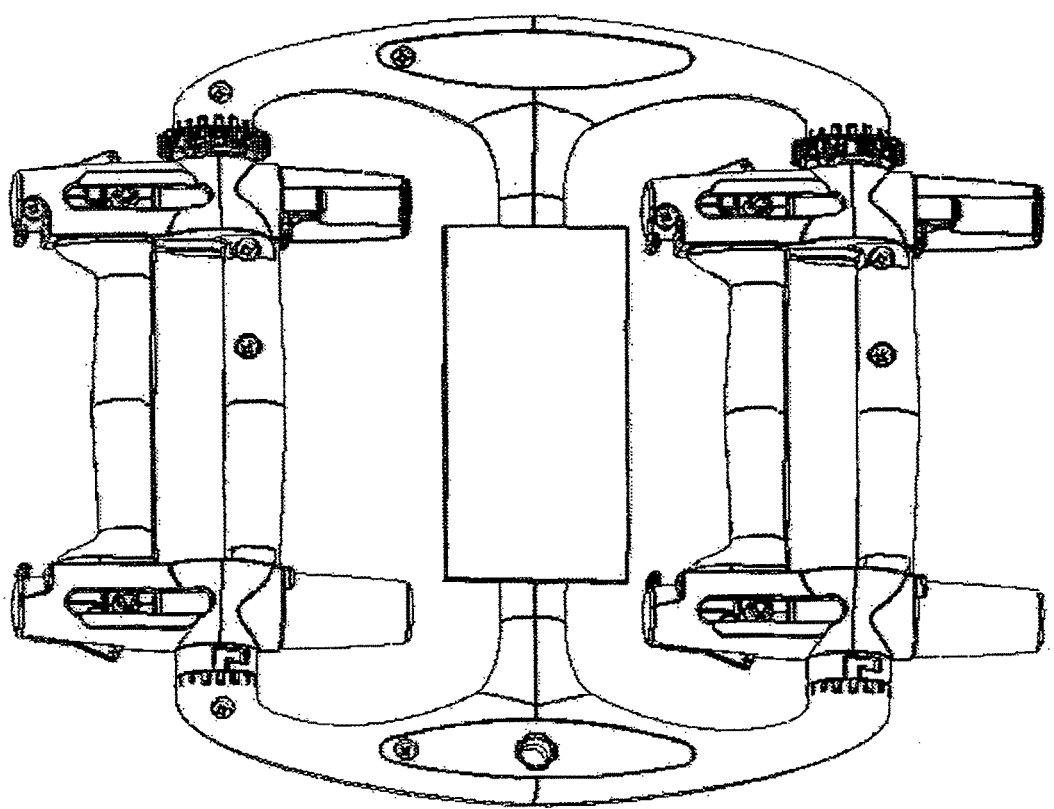
FIG. 34 is an alternative embodiment of the manual manipulation apparatus of FIG. 31 without a base.

The apparatus disclosed in FIG. 31 or 32 can also be provided without a base, in which case the apparatus can be hand-held. This is shown in FIG. 34. Other instantly disclosed embodiments can also be provided without a base.

These and other advantages of the present invention will be apparent to those skilled in the art from the foregoing specification. Accordingly, it will be recognized by those skilled in the art that changes or modifications can be made to the above-described embodiments without departing from the broad inventive concepts of the invention. It should therefore be understood that this invention is not limited to the particular embodiments described herein, but is intended to include all changes and modifications that are within the scope and spirit of the invention as defined in the claims.

What is claimed is:

1. A manual manipulation apparatus for a user comprising an independent frame assembly; and
at least one handle assembly associated with the independent frame assembly, the at least one handle assembly including:
a fixed handle member and a second handle member, so that the second handle member is linearly moveable relative to the fixed handle member, one or more of the fixed handle member and the second handle member configured to engage with the independent frame assembly so as to position at least the second handle member to be manipulated by the user,
a biasing member positioned between the fixed handle member and the second handle member which biases the second handle member to an initial position, and
a force indicator configured to visibly indicate a variable force applied to one or more of the fixed handle member and the second handle member as the second handle member linearly moves from the initial position relative to the fixed handle member.

2. The manual manipulation apparatus of claim 1 wherein the force indicator includes a rod moveable with the second handle, the rod including at least one visible force marker thereon.

3. The manual manipulation apparatus of claim 2 wherein the at least one visible force marker is a pointer which moves relative to a scale defined on a housing of the handle.

4. The manual manipulation apparatus of claim 2 wherein the at least one visible force marker includes a plurality of indicator areas along the rod which become visible as the second handle is moved toward the fixed handle.

5. The manual manipulation apparatus of claim 1 wherein the force indicator includes a force sensor positioned within the handle, the force sensor associated with a transmitter configured to transmit a sensed force to an associated computer device.

6. The manual manipulation apparatus of claim 1 such that the at least one handle assembly has an axis and is connected to the frame assembly such that the at least one handle is rotatable about an axis; and an angle indicator configured to indicate an amount of rotation applied to the at least one handle.

7. The manual manipulation apparatus of claim 6 comprising a pair of handle assemblies.

8. The manual manipulation apparatus of claim 6, wherein the manual manipulation apparatus further comprises at least one magnet and a magnetometer.

9. The manual manipulation apparatus of claim 8, wherein the magnetometer is provided by a computer device incorporated within the manual manipulation apparatus.

10. The manual manipulation apparatus of claim 9, wherein the angle indicator is provided by the computer device.

11. The manual manipulation apparatus of claim 6, wherein the angle indicator is provided by markings or other indicia indicating position on one or more of the frame assembly and the handle assembly.

12. The manual manipulation apparatus of claim 1 further comprising a mounting structure configured for mounting of a computer device relative to the frame assembly.

13. The manual manipulation apparatus of claim 1 wherein the biasing member is a spring.

14. The manual manipulation apparatus of claim 1 further comprising a magnet and a magnetometer, the magnet configured such that it moves in response to force applied to the second handle member.

15. The manual manipulation apparatus of claim 1 further comprising a glide base connected to the frame assembly, the glide base defining an area of reduced friction.

16. A manual manipulation apparatus for a user comprising an independent frame assembly;

at least one handle associated with the frame assembly configured to engage with the independent frame assembly so as to position the at least one handle to be manipulated by the user;

a mounting structure configured for mounting of a computer device upon the frame assembly, such that the computer device, optionally present, is affixed to and moves together with the frame assembly, when said assembly is moved;

a base optionally connected to the frame assembly; and an indicator configured to indicate one or more of a) a force applied to the at least one handle, and b) a movement of the manual manipulation apparatus.

17. The manual manipulation apparatus of claim 16, wherein the indicator includes a magnet and a magnetometer.

18. The manual manipulation apparatus of claim 17, wherein the magnetometer is provided by the computer device, wherein the computer device is affixed to the mounting structure.

19. The manual manipulation apparatus of claim 16, comprising a pair of handles respectively connected at a first end and a second end to the two opposing outer frame members such that the frame assembly describes a closed contour.

20. The manual manipulation apparatus of claim 16, wherein the at least one handle comprises a fixed handle member and a second handle member linearly moveable relative to the fixed handle member, a biasing member positioned between the fixed handle member and the second handle member which biases the second handle member to an initial position; and wherein the indicator is a force indicator configured to indicate a the force applied to one or more of the fixed handle member and the second handle member as the second handle member moves linearly from the initial position with respect to the fixed handle member.

21. The manual manipulation apparatus of claim 20, wherein the biasing member is a spring.

22. The manual manipulation apparatus of claim 21, comprising a magnet, wherein the magnet is adapted to move with the spring as said spring is engaged by a user.

23. The manual manipulation apparatus of claim 20, comprising an adjustable lock to set the distance between the fixed handle member and the second handle member.

24. The manual manipulation apparatus of claim 20, comprising a second adjustable lock to set the angle of the handles with respect to the frame assembly.

25. The manual manipulation apparatus of claim 16, wherein the base is fixed with respect to the frame assembly.

26. The manual manipulation apparatus of claim 16, wherein the frame assembly can pivot with respect to the base.

27. The manual manipulation apparatus of claim 18, wherein the computer device is adapted to display an indicia of movement by a user.

28. The manual manipulation apparatus of claim 27, wherein the computer device is adapted to transmit the indicia of movement by the user to a database accessible to a third party.

29. The manual manipulation apparatus of claim 1 in which the one or more fixed handle is fitted with hollow housings at either end which are parallel to each other and perpendicular to the long axis of the handle itself, such that the handle and the handle housings form a U shape, while the moving handle is fitted with rod portions at either end which are likewise parallel to each other and perpendicular to the long axis of the movable handle, also forming a U shape, and such that the two rod portions of the moving handle insert into the two hollow housings of the fixed handle, allowing it to move linearly with respect to the fixed handle.

30. The manual manipulation apparatus of claim 20 wherein the computer device is attached and the force indicator is implemented by the combination of 1) a permanent magnet which is attached to and moves with the second handle member and 2) the computer device, containing an integrated magnetometer, which is configured to sense changes in magnetic field as the second handle moves.

31. The manual manipulation apparatus of claim 29 wherein the rod portions of the movable handle may extend beyond the distal open ends of the fixed handle housings so that the extent of linear motion of the movable handle may be indicated by the extent to which the rod portions protrude from the open ends.

* * * * *